United States Patent
Landrock et al.

(10) Patent No.: US 10,581,612 B2
(45) Date of Patent: Mar. 3, 2020

(54) METHOD AND SYSTEM FOR ENCRYPTION

(71) Applicant: Cryptomathic Ltd, Cambridge, Cambridgeshire (GB)

(72) Inventors: Peter Landrock, Cambridge (GB); Guillaume Forget, Munich (DE); Torben Pryds Pedersen, Aarhus C (DK)

(73) Assignee: Cryptomathic Ltd, Cambridge, Cambridgeshire (GB)

(*) Notice: Subject to any disclaimer, the term of this patent is extended or adjusted under 35 U.S.C. 154(b) by 177 days.

(21) Appl. No.: 15/555,425

(22) PCT Filed: Mar. 1, 2016

(86) PCT No.: PCT/GB2016/050536
§ 371 (c)(1),
(2) Date: Sep. 1, 2017

(87) PCT Pub. No.: WO2016/139462
PCT Pub. Date: Sep. 9, 2016

(65) Prior Publication Data
US 2018/0048474 A1 Feb. 15, 2018

(30) Foreign Application Priority Data

Mar. 3, 2015 (GB) .................................. 1503611.4

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/35* (2013.01); *G06F 21/36* (2013.01); *G06F 21/43* (2013.01);
(Continued)

(58) Field of Classification Search
CPC .......... G06F 21/35; G06F 21/36; G06F 21/43; G06F 21/44; G06F 21/602; H04L 9/3247; H04L 9/006; H04L 9/14; H04L 9/30
See application file for complete search history.

(56) References Cited

U.S. PATENT DOCUMENTS

| | | |
|---|---|---|
| 2009/0257671 A1 | 10/2009 | Fridrich et al. |
| 2012/0144458 A1 | 6/2012 | Mechaley, Jr. |

(Continued)

FOREIGN PATENT DOCUMENTS

| | | |
|---|---|---|
| GB | 2489332 A | 9/2012 |
| WO | WO 2008/045139 | 4/2008 |
| WO | WO 2014/199128 | 12/2014 |

OTHER PUBLICATIONS

International Search Report and Written Opinion for International Application No. PCT/GB2016/050536 dated Jun. 2, 2016 in 12 pages.

(Continued)

*Primary Examiner* — Tri M Tran
(74) *Attorney, Agent, or Firm* — Knobbe Martens Olson & Bear LLP

(57) ABSTRACT

There is described a validation and authentication system and method for authenticating and validating messages. The system comprises a data store storing one or more digital fingerprints associated with user imaging devices. There is also a communication module configured to: receive a message M; receive a request for validation and authentication and receive an image $P_M$ of the message M captured using a user imaging device. The system comprises an image validation module for analysing the received image $P_M$ using one or more image processing techniques to determine if the image is valid and authentic. If the received image $P_M$ is determined to be authentic and valid, the image validation module generates a response to the request.

25 Claims, 10 Drawing Sheets

(51) Int. Cl.
*G06F 21/35* (2013.01)
*G06F 21/44* (2013.01)
*G06F 21/60* (2013.01)
*G06F 21/36* (2013.01)
*G06F 21/43* (2013.01)
*H04L 9/00* (2006.01)
*H04L 9/14* (2006.01)
*H04L 9/30* (2006.01)

(52) U.S. Cl.
CPC ............ *G06F 21/44* (2013.01); *G06F 21/602* (2013.01); *H04L 9/006* (2013.01); *H04L 9/14* (2013.01); *H04L 9/30* (2013.01)

(56) References Cited

U.S. PATENT DOCUMENTS

| | | | |
|---|---|---|---|
| 2012/0195476 A1 | 8/2012 | Bayram et al. | |
| 2013/0138967 A1* | 5/2013 | Auld | H04L 9/3231 713/180 |
| 2013/0179692 A1 | 7/2013 | Tolba et al. | |
| 2014/0282961 A1 | 9/2014 | Dorfman et al. | |
| 2015/0026478 A1* | 1/2015 | Raduchel | H04L 9/3247 713/178 |

OTHER PUBLICATIONS

UK Search Report for Application No. GB1503611.4 dated Aug. 11, 2015 in 4 pages.

* cited by examiner

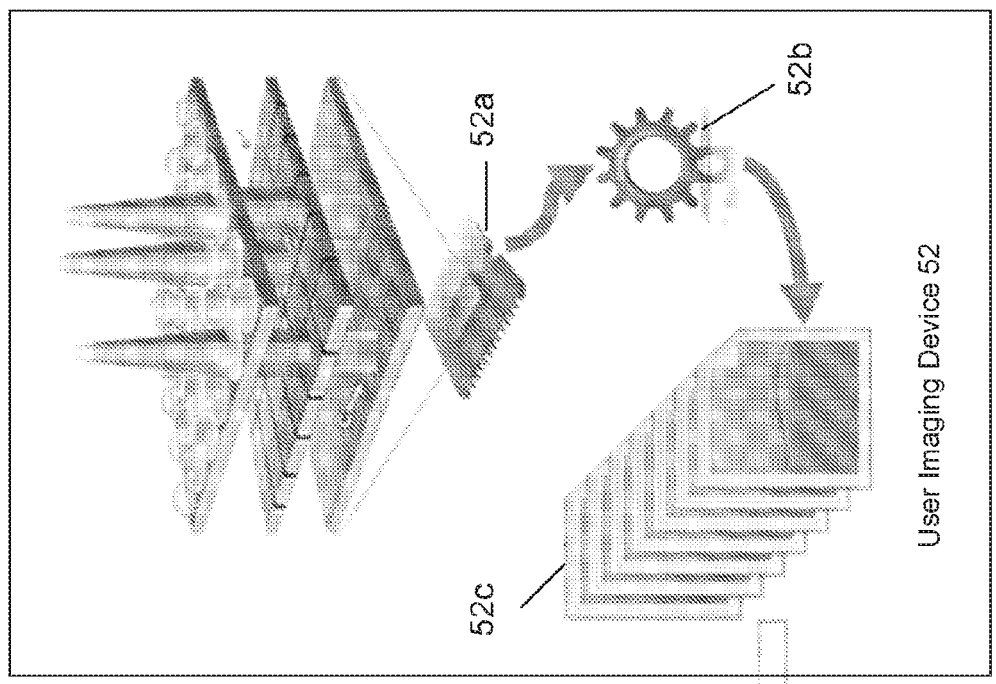
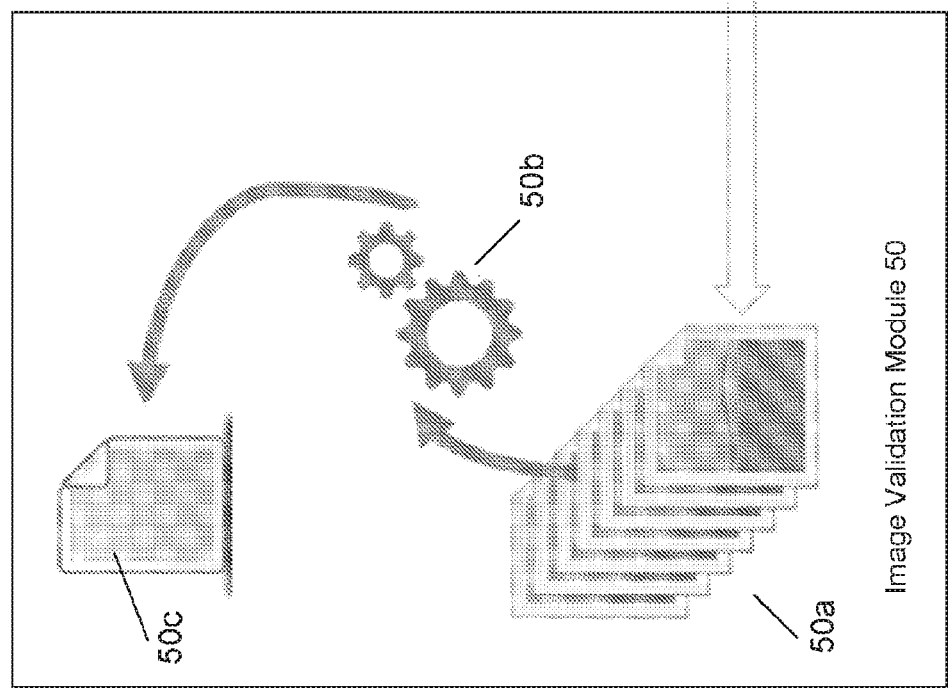
Fig. 5

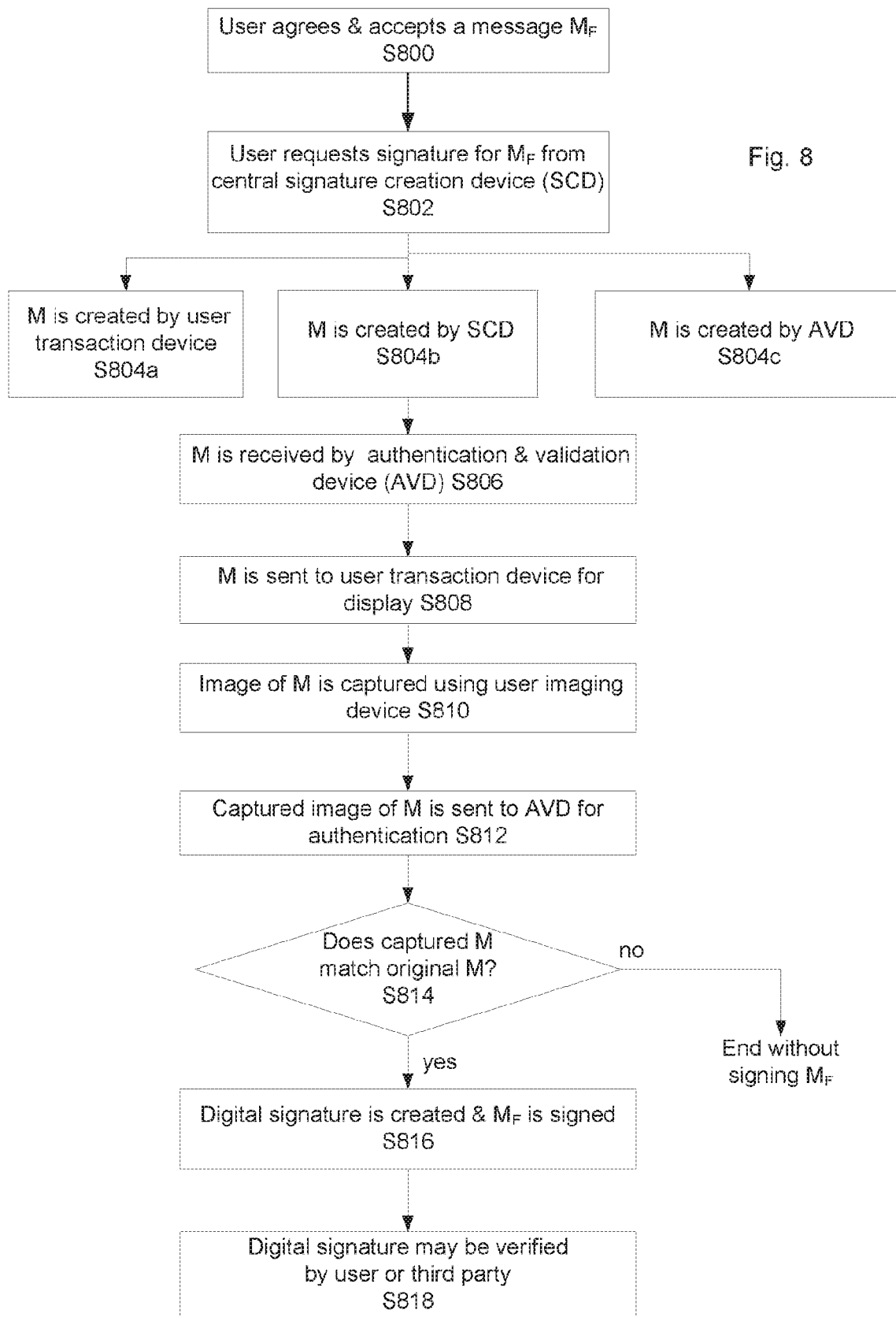

METHOD AND SYSTEM FOR ENCRYPTION

CROSS-REFERENCE TO RELATED APPLICATIONS

This application is the U.S. National Phase under 35 U.S.C. § 371 of International Application No. PCT/GB2016/050536, filed Mar. 1, 2016, designating the United States and published in English on Sep. 9, 2016 as Int'l Publ. No. WO 2016/139462, which claims priority to United Kingdom Application No. 1503611.4, filed Mar. 3, 2015.

FIELD OF THE INVENTION

The invention relates to systems and methods for validating and authenticating messages or visually represented versions of electronic messages, for authenticating users and for providing digital signatures.

BACKGROUND TO THE INVENTION

The rapid growth and development of Internet technology has resulted in the emergence of new ways to perform transactions, exchange information, and perform "e-commerce" or "e-government" activities. Generally, e-commerce is used to describe a wide range of commercial transactions conducted on or through the Internet, including retail and direct marketing, purchasing goods and services, and the term e-government is used to describe the use of technologies to facilitate the operation of government and the dispersing of government information and services, including exchange of trustworthy documents.

The move towards digitalisation has created a new security paradigm where key concepts such as authenticity and non-repudiation are of primary importance for all stakeholders involved in e-commerce or e-government transactions. Digital signatures are one way of addressing this. However, it remains challenging to ensure that transaction data was unaltered when presented to the stakeholder authorising the transaction, and wilfully accepted by the stakeholder. Fraudsters exploit protocol, browser or other software vulnerabilities to launch "man-in-the-middle" or "man-in-the-browser" attacks which take control over the communication layer between parties attempting to perform a transaction, and proceed to alter the transaction data without being detected. For example, it has been demonstrated that sophisticated attacks such as "advanced cross site scripting" enable fraudsters to hijack a victim's web browsing session and alter the content displayed to the victim on his web browser.

Public-key infrastructure (PKI) smart cards may also be prone to such attacks. For example, it has been shown that using a Common Access Card (CAC) issued by the US Department of Defence on an untrusted workstation can allow a variety of attacks to be performed by malicious software. These attacks range from simple PIN phishing to more serious attacks such as applying signatures on unauthorised transactions and performing authentication of users without consent.

Generally speaking, there are a number of schemes which can be used to authenticate transactions:

Authentication schemes enable party A (e.g. a user) to prove to party B (e.g. a provider of an online banking service) that he is A, but someone else cannot prove to B he is A. An example authentication scheme is one which uses symmetric encryption techniques together with a shared key.

Identification schemes enable A to prove to B that he is A, but B cannot prove to someone else that he is A. In software based protocols, strong identification schemes use public key techniques. These techniques prove that A's private key was involved in the transaction, but they do not require A's key to be applied to a message having particular content. So-called zero-knowledge identification schemes fall in this is category.

Signature schemes allow A to prove to B that he is A, but B cannot even prove to himself that he is A. In the secure signature scheme, the underlying protocol cannot be simulated by B, as opposed to in an identification scheme where this may be possible.

In one particular implementation of a signature scheme, users are required to carry around their private keys stored on a local signature creation device, such as a smartcard or a signing stick featuring a microchip. This approach has some drawbacks since it requires the availability of a USB port and/or a smart card reader in order for the private key to be used. The unitary combined cost of the smart card reader and the smart card also impedes large deployments in retail. Furthermore, such peripheral devices may not be suitable for web-based transactions, and there may be compatibility issues between old and modern devices, or different brands of devices. It is also essential that the user keeps the signature creation device in a secure location which impedes mobility and ease of use. Due to these drawbacks, this approach has not be implemented on a large scale, and is generally restricted to controlled environments with few users.

An alternative approach for a signature scheme is described in EP1364508B1. This scheme uses a central (secure) signature creation device which centrally stores private keys for the creation of a signature for a user, while ensuring that their owner retains sole control over them. This approach is now widely used in, for example, Denmark, Norway and Luxembourg, by almost all citizens, business and public services organisations.

During the past 30 years, a number of other commercial solutions have also evolved, which have become more and more advanced, as the attacks have become more and more elaborate. The less secure solutions provide some degree of session security, which attempt to identify the user only but do not secure a transaction message itself. For example, one early solution relied on a static password being forwarded with the message. More recent solutions have relied on One Time Passwords (OTPs) to be forwarded with the message, where the OTPs are generated independently of the content of the message.

With the advent of smart phones, a range of new opportunities have appeared. These have been exploited, for example in EP1969880 and EP1959374, in which dedicated hardware is used to meet the two requirements above in relation to authentication and identification, but at the price of requiring quite expensive hardware.

One way to ensure that a user authorises or signs the transaction that they intended to perform is by offering effective What You See Is What You Sign functionality to authenticate electronic transactions. This concept was first introduced by Peter Landrock and Torben Pedersen in "WYSIWYS? What you see is what you sign?"—Information Technology Technical Report, Elsevier Vol 3, No 2, 1998. However, none of the above-mentioned approaches guarantees the WYSIWYS functionality without requiring further measures to be implemented, such as voice confirmation or the use of separate out-of-band channels. One strong realisation of WYSIWYS, albeit perhaps not the most user-friendly, is the Chip Authentication Program (CAP) developed by MasterCard and later adopted by Visa as Dynamic Passcode Authentication (DPA). CAP and DPA require a standalone card reader and a debit or credit EMV chipcard. Once a user has provided the details of a payment on e.g. a workstation, he is asked to engage his debit or credit chipcard in the card reader by keying in his PIN and choosing the function "sign". He is then required to key in the amount to be paid and the account of the payee, and a message authorisation code (MAC) is generated by his debit or credit chipcard and displayed on the reader. He subsequently keys the MAC and his transaction into his workstation. The cryptography behind this is a symmetric encryption system with a key shared between the payment card and the bank backend. This appears to be an authentication scheme which falls with the definition given above. However, as the key on the payment chipcard and the bank backend is protected by tamper resistant hardware this is arguably in fact a signature scheme. Nevertheless, the CAP system is widely used to securely perform electronic banking transactions.

Thus, WYSIWYS can be achieved using a combination of symmetric cryptographic techniques and tamper resistant hardware. However, signature schemes based on public key techniques are particularly useful if not indispensable in electronic commerce, where many independent parties communicate with other independent parties (e.g. multiple customers buying goods from multiple different vendors), as opposed to electronic banking, where the communication is many-to-one (i.e. multiple bank customers for a particular bank). Moreover, none of the techniques and methods described above have addressed the need to provide strong WYSIWYS functionality bound to a legally binding electronic signature carried out by a local or central signature creation device (SCD), as defined in the European Parliament Regulation on Electronic Identification and Trust Services (http://eur-lex.europa.eu/legal-content/EN/TXT/?uri=uriserv:OJ.L_.2014.257.01.0073.01.ENG) as well as the Directive on Electronic Signatures [Directive 1999/93/EC].

In international patent application WO2014/199128, which is incorporated herein by reference in its entirety, the applicant described a method and apparatus for requesting and providing a digital signature based on the WYSIWYS concept. In WO2014/199128, the applicant described a method of generating a signature on behalf of a user having a first and second user device, where the method comprises receiving a request from the first user device to create a signature for a first message M; generating a validation challenge using a second message M' which is based on the first message M and a first secret shared with the user; sending the validation challenge to the user to enable the second user device to regenerate the second message M'; receiving a validation code from the second user device, the validation code confirming the request to create a signature; and generating the signature for the user for the first message M. Central to this concept is the interaction between the first and second user devices, where the two devices are preferably separate from one another. The request for a signature is received from the first user device and is confirmed from the second user device before the signature is created. Moreover, the validation challenge is generated so that the message can be recreated on the second user device in order that a user can see the message before confirming the signature request. Accordingly, the "What You See Is What You Sign" (WYSIWYS) functionality is provided in that the digital signature is generated on a hash value of the message.

However, one drawback of this method is that the user has to trust that he is signing a hash on the message he has seen. The user does not know whether he is signing a hash on the original seen message, or some other fraudulent message.

Therefore, the present applicant has recognised the need for improved methods and systems to perform secure transactions, preferably using the WYSIWYS concept.

While these improved methods and systems can be used to guaranty sole control of the user over the signature process, people skilled in the art will appreciate that they can equally well be used for user authentication in situations not requiring authentication of transactions.

SUMMARY OF THE INVENTION

According to a first aspect of the invention there is provided a validation and authentication system for validating and authenticating messages, the system comprising: a data store storing one or more digital traces associated with user imaging devices; a communication module configured to: receive a message M; receive a request for validation and authentication of the message M; and receive an image $P_M$ of the message M captured using a user imaging device; and an image validation module for analysing the received image $P_M$ using one or more image processing techniques to determine if the image is valid and authentic, wherein, if the received image $P_M$ is determined to be valid and authentic, the image validation module generates a response to the request.

According to a second aspect of the invention there is provided a method of validating and authenticating a message, the method comprising: receiving a message M to be validated and authenticated; receiving a request for validation and authentication of the message M; receiving an image $P_M$ of the message M captured using a user imaging device; analysing the received image $P_M$ using one or more image processing techniques to determine if the image is valid and authentic; and generating, if the image is valid and authentic, a response to the request.

The following features apply to both aspects of the invention.

The digital traces may also be called (digital) fingerprints and the terms may be used interchangeably in the following. Broadly speaking, embodiments of the present invention provide methods and systems which use image processing techniques to securely perform electronic transactions and/or to authenticate and validate messages, based on the "what you see is what you sign" (WYSIWYS) concept. Electronic transactions may include the act of buying or selling goods or services, and transferring money electronically, particularly over in the internet. Messages may include documents or purchase orders relating to an electronic transaction, as well as any other documents which require some form of authentication/validation by a third party.

It will be appreciated that if the image is valid and authentic, the response which is generated is a positive response and may be a confirmation that the image is valid and authentic. A response may also be generated if the image is determined to be not valid and authentic; such a response will be a negative response indicating that the image cannot be confirmed as valid and authentic. Thus, a response is normally generated and the response indicates the results of the analysis.

The validation and authentication system may be a central validation and authentication system which is remote from both the third party and the user imaging device. Alternatively, the validation and authentication system may be local to one of the third party and the user imaging device. Components of the validation and authentication system may also be implemented on the third party and/or user imaging device, if security can be maintained. By remote it is meant that the system is functionally and possibly also geographically separated from the user imaging device and the third party. By local, it is meant that the system is at least partially implemented on the same device.

The request may be a request for validation and authentication of the message M and/or the user. Thus, if the received image $P_M$ is determined to be authentic and valid, the image validation module generates a response to the request which confirms that the message M and/or the user is authentic and valid, as appropriate. The response may state whether the message M and/or the user is authentic and valid. Alternatively, the response may provide information which allows the party receiving the response (e.g. the third party or the relying party) to confirm that the message M and/or the user is authentic and valid. For example, the response may be a user identification (of the user or the device) which can be confirmed by the party receiving the response (e.g. the third party or the relying party)

The third party is the entity that requires strong user authentication to perform some action such as authorising a transaction, signing a transaction, granting a privilege to the user or similar. Typically, the third party uses a web server to communicate with the user. When required, the third party's system sends an authentication request to the validation and authentication system, and specifically to the image validation module. The authentication request may also feature a challenge to bind the authentication request to a particular session, or to some data that the user needs to authenticate. The authentication challenge (also referred to as a transaction message or electronic message M herein) is forwarded to the user. In order to process the transaction, the third party requires an authentication response from the user. The authentication response is provided to the third party by the image validation module upon receipt by the image validation module of the image $P_M$ captured by the user, and verification of the image by the image validation module.

Generally speaking, the image processing performed by the image validation module to validate and/or authenticate the received image $P_M$ comprises any one or more of the following steps:
 (a) uniquely linking the received image $P_M$ to a device used to capture the image,
 (b) ensuring that the image $P_M$ is genuine and has not been altered while in transit, and
 (c) comparing the data in the original message M against data extracted from the image $P_M$ to determine if the data in the message has not been altered.

The received image $P_M$ may be validated (to ensure it originates from a registered imaging device), before it is authenticated (to check that the message captured in the image $P_M$ matches the original message M). Alternatively, in the interests of latency, the validation and authentication (and associated processes) may be run simultaneously. Either or both of steps (a) and (b) above may be performed to validate the received image. Step (c) may be performed to authenticate the message within the image. The order of the steps is typically not important.

Thus, in embodiments, the image validation module comprises a ballistics sub-module configured to determine using a matching algorithm that the received image $P_M$ comprises a digital fingerprint matching with reasonable certainty one of the digital fingerprints stored in the data store. The ballistics sub-module is configured to perform step (a) above. Image/camera ballistics is a field of image processing in which analysis of some artefacts of a digital image allows the imaging device to be identified.

In embodiments, the image validation module comprises a forensics sub-module configured to determine that the received image $P_M$ has not been altered between the user imaging device and the validation and authentication system. The forensics sub-module is configured to perform step (b) above. Image forensics is a field of image processing in which analysis of a digital image allows for the detection of digital image manipulation.

In embodiments, the image validation module comprises an optical character recognition (OCR) sub-module configured to extract the message M from the received image $P_M$ and compare the extracted message with the received message M. The OCR sub-module is configured to perform step (c) above. Optical Character Recognition (OCR) is an image processing technique which is used to extract any text contained within an image with the greatest possible accuracy.

Preferably, the communication module is configured to receive the message M from a third party system, e.g. a bank or online vendor with whom a user is attempting to transact. By communicating with the third party system directly, preferably via a secure channel, the validation and authentication system is configured to receive the original version of the message M directly, which is required to determine if the message within image $P_M$ matches the original message M.

In embodiments, a user is required to use two different devices to perform a secure transaction using the validation and authentication system: a user imaging device and a user transaction device. The user transaction device is a computing device used to perform a transaction with a third party, and may be a workstation, PC, mobile computing device, laptop, smartphone, tablet PC, etc. The user imaging device is a separate computing device to the transaction device, and is able to capture images, and can communicate with other devices/systems. For example, the imaging device may be a smartphone having an embedded digital camera, or a computing device coupled to an external digital camera (such as a webcam). The user imaging device is registered in the validation and authentication system, such that the system has determined and stored the digital fingerprint associated with the user imaging device. The user imaging device is configured to communicate with the validation and authentication system. The communication may be direct, e.g. via the internet, via an MMS, via a mobile network, etc.). Additionally or alternatively, the communication may be indirect. For example, the user imaging device may transmit captured images to the user transaction device (e.g. via WiFi, Bluetooth® or other short range communication), which can forward the images itself to the image validation module (directly or indirectly via the third party).

In embodiments, the communication module is configured to receive a request for validation and authentication of the message M from a user or a third party system. The third party system may transmit the request for authentication together with the original message M to the validation and authentication system. Additionally or alternatively, the user imaging device may be configured to transmit the captured image $P_M$ together with a request for authentication. Additionally or alternatively, the user transaction device may be configured to transmit the captured image $P_M$ (where the image is captured by, and received from, the user transaction device) together with a request for authentication. The request may include data to identify the user imaging device so that the image validation module can find the appropriate data (e.g. the unique fingerprint data) stored within the module to help validate the image.

In embodiments, the communication module is configured to receive image $P_M$ of the message M from the user. The user imaging device communicates with the communication module using a separate communication channel relative to that used by the third party system and communication module. Additionally or alternatively, the user transaction device may be configured to transmit the captured image $P_M$ (where the image is captured by, and received from, the user transaction device).

In embodiments, analysing the received image $P_M$ comprises using a ballistics image processing algorithm to extract a digital fingerprint from the received image $P_M$. Preferably, the analysis comprises comparing the extracted digital fingerprint with a set of stored digital fingerprints, and determining if the extracted digital fingerprint corresponds to a stored digital fingerprint. If the image appears to originate from an imaging device which is registered in the system (i.e. it has a fingerprint which is stored in the data store of the system), the image validation module may then apply further image processing techniques to the received image of message M to authenticate the image.

Each of the modules mentioned above may be apparatus, e.g. a server, operating a software application. Preferably, the security sensitive operations of such image validation or authentication are processed within the tamper-resistant environment of a Hardware Security Module (HSM) to avoid any eavesdropping from an attacker and to prevent a response from being counterfeited by a rogue administrator. It is possible that one or more modules may be implemented on a different part of the system, e.g. on the imaging device itself.

In embodiments, analysing the received image $P_M$ further comprises using a forensics image processing algorithm to determine that the received image $P_M$ has not been altered during transit, i.e. between being captured by the user imaging device and being received by the image processing module.

In embodiments, analysing the received image $P_M$ further comprises using an optical character recognition algorithm to extract the message M from the received image $P_M$ and compare the extracted message with the received message M (received directly from the third party system).

Thus, in embodiments, receiving an electronic message M to be authenticated and validated comprises receiving the message M from a third party system.

In embodiments, receiving a request for validation and authentication of the electronic message M comprises receiving a request from a user imaging device or a third party system.

In embodiments, receiving an image $P_M$ of the electronic message M comprises capturing an image $P_M$ of the message M using a user imaging device and receiving the image from the user imaging device.

The above systems and methods may also be used to generate digital signatures. A user identifies a specific message $M_F$ on a computing device that he is prepared to commit to with a digital signature. The message may be a transaction, document or purchase order in electronic form. As his computing device may be an insecure platform, the user typically cannot commit to signing the message on this device because an attacker on the device may replace the message with another one. Thus, once the user has accepted the message $M_F$ and wishes to sign the message, a request for signature creation is sent from the user to a signature creation device. The signature creation device is where the digital signature generation is carried out. The signature creation device may be a central signature creation device such as a signing server, or a local signature creation device such as a smart card or a signing stick Thus, according to a further aspect of the invention, there is provided a system for generating a digital signature on behalf of a user, the system comprising: a signature server; a data store storing one or more digital fingerprints associated with user imaging devices; a communication module configured to: receive a request to create a signature for an electronic message $M_F$; receive an electronic message M, which is based on message $M_F$; receive a request for validation and authentication of the electronic message M; and receive an image $P_M$ of the electronic message M from a user; and an image validation module for analysing the received image $P_M$ using one or more image processing techniques to determine if the image is authentic, wherein, if the received image $P_M$ is determined to be authentic and valid, the signature server generates a digital signature for electronic message $M_F$.

Once the signature server (SCD) has received a request to sign a message $M_F$, the SCD will not create the signature until it has received evidence that the user has committed to signing this particular message, and that the message is authentic. In essence, this is achieved by requiring an authentication challenge to be completed by the user. A copy of the message, M, is created in embodiments by the SCD, which then transmits the copy M to a validation and authentication module which may be the validation and authentication system described above. The above-described techniques to authenticate and validate message M apply equally here. The copy M is sent to the user and to complete the authentication challenge, the user is prompted to capture an image of M, and transmit it to the image validation module for validation. One or more of the above-described image processing techniques are applied to determine the authenticity of the capture image $P_M$. If the captured image is determined to be authentic, the SCD generates the requested digital signature to sign the message $M_F$. Thus, the image processing techniques ensure that the signature can only be generated if this image validation has been successful.

According to a related aspect of the invention, there is provided a method of generating a digital signature, the method comprising: receiving a request to create a signature for an electronic message $M_F$; generating a validation challenge comprising an electronic message M which is based on message $M_F$; authenticating and validating the electronic message M using any of the steps described above; and generating the signature for the electronic message $M_F$.

According to a related aspect of the invention, there is provided a method of generating a digital signature, the method comprising: receiving a request to create a signature for an electronic message $M_F$; generating a validation challenge comprising the electronic message M which is based on message $M_F$; receiving the electronic message M to be authenticated and validated; receiving a request for validation and authentication of the electronic message M; receiving an image $P_M$ of the electronic message M from a user; analysing the received image $P_M$ using one or more image processing techniques to determine if the image is authentic and valid; receiving a validation response confirming that the received image $P_M$ is valid and authentic; and generating the signature for the electronic message $M_F$.

The signature for the electronic message $M_F$ may be generated using a signature creation device which is local or remote to the user imaging device. Authenticating and validating may be done at an authentication and validation system which is part of the signature creation device. Alternatively, authenticating and validating may be done at an authentication and validation system which is part of the user imaging device or part of a user transaction device. Alternatively, authenticating and validating may be done at an authentication and validation system which is remote.

The above described features apply to all aspects of the invention.

In a further aspect of the invention, there is provided a non-transitory data carrier carrying processor control code which when running on a processor, causes the processor to implement any of the above-described methods.

The invention further provides processor control code to implement the above-described systems and methods, for example on a general purpose computer system or on a digital signal processor (DSP). The method is thus a computer-implemented method which runs on a processor and the system and/or each server may comprise a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

BRIEF DESCRIPTION OF THE DRAWINGS

The invention is diagrammatically illustrated, by way of example, in the accompanying drawings, in which:

FIG. 5 is a sketch of a system to process images captured by a user imaging device to generate a fingerprint for the device;

FIGS. 7b and 7c are two arrangements showing the adaptation of FIG. 1 to the method shown in FIG. 7a;

FIG. 8 illustrates a detailed flow chart of example steps to authenticate a digital signature in a public key infrastructure.

DETAILED DESCRIPTION

Figure 1:
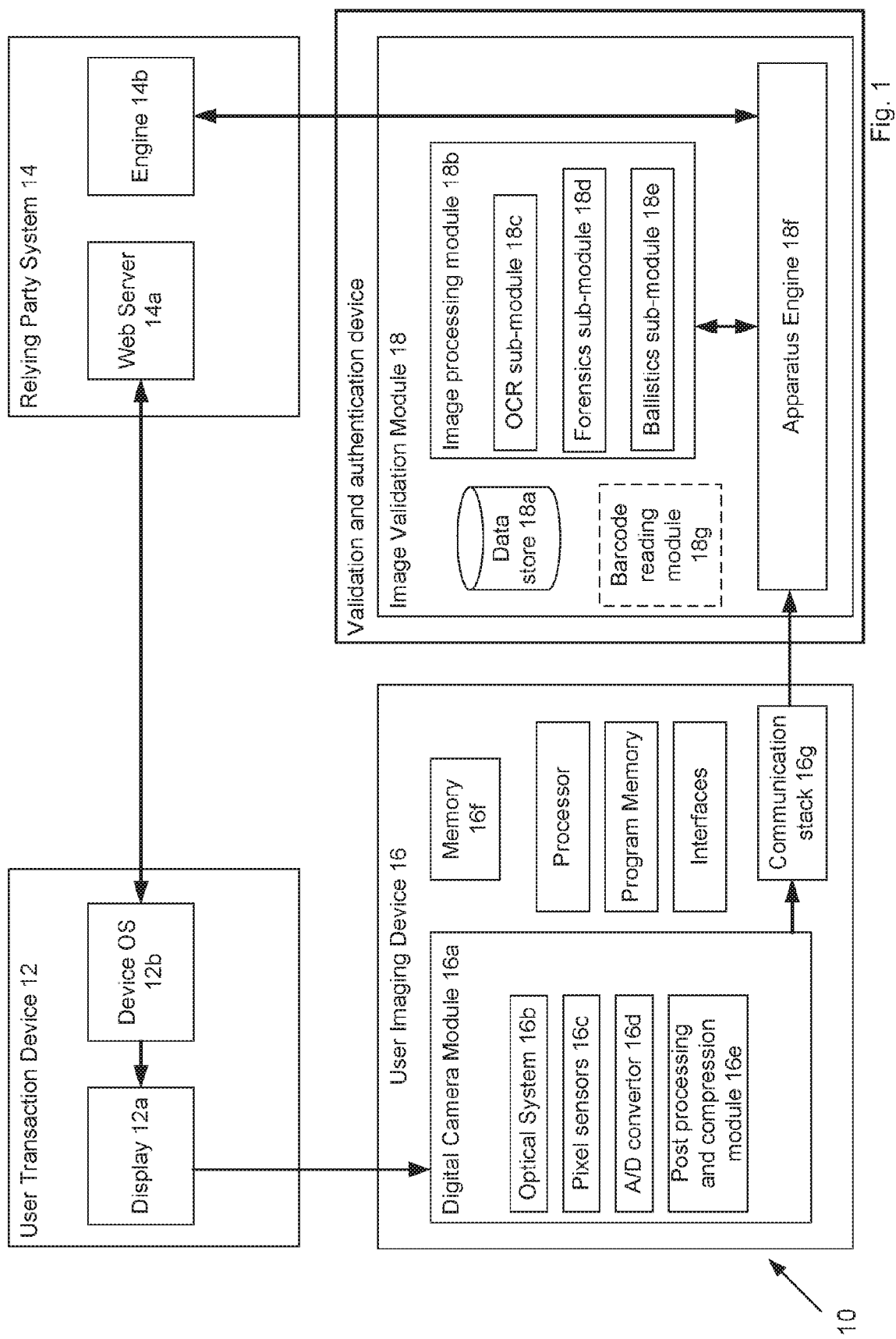
FIG. 1 shows a block diagram of a system to authenticate and validate a transaction, in an embodiment of the invention.

Broadly speaking, embodiments of the present invention provide methods and systems which use image processing techniques to securely perform electronic transactions and/or to perform authentication, based on the "what you see is what you sign" (WYSIWYS) concept. This authentication method can be used on its own or in combination with other methods to create strong authentication. Authentication of users is typically based on something a user has, something a user knows, or something about the user himself (e.g. biometric data). Here, the authentication method is based on a digital camera in the possession of the user, where the digital camera is able to capture digital images and communicate electronically with other devices/systems. In embodiments the method comprises a user capturing a picture of a screen displaying the transaction he wants to approve. This captured digital image is then processed by a separate, independent device using various image processing techniques to perform device validation, and optionally, to offer transaction data integrity authentication. The digital camera communicates with the separate, independent device directly or indirectly, as explained in more detail below.

As mentioned above, a problem with known WYSIWYS-based systems is that a user must trust that he is signing/authorising a hashed version of the transaction message M that he has seen, and not a hashed version of a fraudulent message (that he has not seen). Thus, here the WYSIWYS concept is implemented using image processing techniques to ensure that a transaction is not tampered with between the user initiating the transaction and the user authorising/completing the transaction. A transaction is displayed on the screen of a user's computing device. He is required to capture an image of the displayed transaction using a separate imaging device (e.g. a smartphone or second computing device coupled to a digital camera). The captured image is sent for validation to a remote trusted party. The validation process comprises the following general steps:
 (a) uniquely linking the image received by the trusted party to the device used to capture the image,
 (b) ensuring that the image is genuine and has not been altered while in transit to the remote trusted party, and
 (c) comparing the transaction data displayed to the user (embedded in the captured image), against the transaction data provided by the third party with whom the user is attempting to perform the transaction.

The ability to capture transaction details in the form of an image provides substantial and convincing evidence that this particular transaction was approved through the wilful act of the user and thus is an improved implementation of the WYSIWYS concept.

Some processes for addressing points (a) to (c) above are described below. These are merely illustrative and a skilled person would understand that different equivalent techniques could be used.

(a) Uniquely Linking the Received Image to the Imaging Device

Image/digital camera ballistics is a field of image processing in which analysis of some artefacts of a digital image allows the imaging device to be identified. Generally speaking, a digital image is often corrupted by imperfections in the imaging sensor/digital camera in two ways: (1) each pixel value is modulated by a small amount that is independent of the pixel value (this is termed additive noise), and (2) each pixel value is modulated by a small amount that depends on the pixel value (this is termed multiplicative noise, or more formally, the photo response non-uniformity, PRNU). PRNU is the result of hardware imperfections in the pixel sensors of an imaging device. It is formed by a variation in the pixel dimensions and inhomogeneity in the silicon used to manufacture the sensor, which results in pixel output variations. Research has shown that PRNU is unique, not dependent on temperature, and seems to be stable over time. Thus, PRNU can be used to provide a fingerprint for each imaging device which is unique to the device.

Researchers have developed various algorithms to link a given image to a source imaging device, examples of which are described by: Kurosawa et al (CCD Fingerprint Method-Identification of a Video Camera from Videotaped Images, *IEEE International Conference on Image Processing*, pages 537-540, 1999), Lukas et al (Digital Camera Identification from Sensor Noise (2006), *IEEE Transactions on Information Forensics and Security*, 1:2(205-214)), Chen et al (Determining Image Origin and Integrity Using Sensor Noise (2008), *IEEE Transactions on Information Forensics and Security*, 3:1(74-90)), Fridrich (Digital Image Forensic Using Sensor Noise (2009), *IEEE Signal Processing Magazine*, 26:2(26-37)), Hu et al (Using improved camera sensor pattern noise for source camera identification (2010), *ICME*, pp. 1481-1486) and more recently Mandian et al (A Novel Method for Identifying Exact Sensor Using Multiplicative Noise Component (2013), *IEEE International Symposium on Multimedia*, pages 241-247). Generally speaking, these algorithms can be used to link an image to the device which captured the image by performing the following steps:

(i) Firstly, analyse a set of images captured by the imaging device to extract representative reference data, i.e. a "digital fingerprint", a "camera fingerprint" or "fingerprint", of the camera sensor PRNU noise; and (ii) Secondly, compare the PRNU noise of a received image against the reference fingerprint to assess with great probability if this image was captured by the suspected imaging device. This technique been described by Rosenfeld et al (K. Rosenfeld and H. T. Sencar, "A study of the robustness of PRNU-based camera identification", *Proceedings of the Media Forensics and Security I*, part of the IS&T-SPIE Electronic Imaging Symposium, vol. 7254 of Proceedings of SPIE, San Jose, Calif., USA, January 2009).

The process to extract a fingerprint for an imaging device is described in more detail below with respect to FIGS. 5 and 6.

(b) Ensuring the Image Received by the Remote Trusted Party is Genuine

Image forensics is another field of image processing in which analysis of a digital image allows for the detection of digital image manipulation. As explained by Alessandro Piva (An overview of image forensics, *ISRN Signal Processing*, Volume 2013 (2013), Article ID 496701, 22 pages, http://dx.doi.org/10.1155/2013/496701), image forensics techniques rely on the observation that each phase of the image history, from the acquisition process, to its storing in a compressed format, to any post-processing operation leaves a distinctive trace on the data, as a sort of digital fingerprint. It is then possible to identify the source of the digital image or determine whether it is authentic or modified by detecting the presence, the absence, or the incongruence of such features intrinsically tied to the digital content itself.

Several techniques and algorithms have been developed to expose digital forgery, some of which are described by: Gallagher (Detection of linear and cubic interpolation in JPEG compressed images, *Proceedings of the Canadian Conference on Computer and Robot Vision*, pp. 65-72, May 2005), Van Lanh et al (A survey on digital camera image forensic methods, *Proceedings of the IEEE International Conference on Multimedia and Expo (ICME '07)*, pp. 16-19), Farid (Image forgery detection, *IEEE Signal Processing Magazine*, vol. 26, no. 2, pp. 16-25), Mandian and Saic (A bibliography on blind methods for identifying image forgery, *Signal Processing: Image Communication*, vol. 25, no. 6, pp. 389-399) or Yerushalmy et al (Digital image forgery detection based on lens and sensor aberration, *International Journal of Computer Vision*, vol. 92, no. 1, pp. 71-91, 2011).

(c) Ensuring the Transaction Data in the Received Image is Genuine

Optical Character Recognition (OCR) is an image processing technique which is used to extract any text contained within an image with the greatest possible accuracy.

One or more of these three image processing techniques are used in embodiments of the present invention to securely perform transactions and to ensure transactions are authentic. Turning now to FIG. 1, this shows a block diagram of a system 10 to authenticate and validate a transaction between a user and a relying party, in an embodiment of the invention. The user may be attempting to, for example, purchase goods or services online from a relying party (vendor/merchant), or perform an online banking transaction with the relying party (bank). The validation and authentication may be performed by a remote trusted party system (also termed to herein as a 'central validation and authentication system') which is located remote to, and is independent of, the user and user devices and any system 14 operated by the relying party. Alternatively, the validation and authentication may be performed by a module which is located locally and may be integrated, at least in part, into the user devices.

A user is required to register with the remote trusted party system before he can use the system to securely perform electronic transactions. The registration process is described in more detail below with respect to FIGS. 3 and 4. The user is required to use two different devices to perform a secure transaction using the system 10: a user imaging device 16 and a user transaction device 12. The user transaction device 12 is a computing device used to perform a transaction, such as a workstation, PC, mobile computing device, laptop, smartphone, tablet PC, etc. The transaction device 12 is a connected terminal featuring a web browser allowing for the communication with a remote web server 14a. The user transaction device comprises a processor couple to program memory storing computer program code to enable transactions to be performed on the device, to working memory and to interfaces such as a screen 12a, keyboard, mouse, touchscreen, and network interface to enable communication with the relying party system 14.

The processor may be an ARM® device or a similar processor produced by another manufacturer such as Intel. The program memory, in embodiments, stores processor control code to implement functions, including an operating system, various types of wireless and wired interface, storage and import and export from the device. The transaction device comprises a user interface to enable the user to perform transactions (e.g. buy goods or services or online banking) with the relying party. A wireless interface, for example a Bluetooth®, Wi-Fi or near field communication (NFC) interface may be provided for interfacing with other devices.

The user imaging device 16 is a separate computing device to the transaction device, and is able to capture images. For example, imaging device 16 may be a smartphone having an embedded digital camera, or a computing device coupled to an external digital camera (such as a webcam). The user imaging device 16 is also registered in the system 10. In embodiments, only the user imaging device 16 is registered in the system 10 as only it communicates with an image validation module 18. Registration of the user imaging device 16 involves determining a unique fingerprint associated with the user imaging device, and storing the unique fingerprint within the image validation module 18 (for example, in data store 18a). Thus, a unique fingerprint is associated with each user imaging device 16 registered in the system 10 to enable the device to be authenticated by the image validation module 18. Furthermore, each user imaging device 16 is linked with its user (who is also registered in the system), such that there is a relationship binding the user and user imaging device within the system. Each user may have multiple imaging devices each of which are registered to him.

As mentioned earlier, it is important for the user imaging device to have some means of communicating with the image validation module 18 either directly or indirectly. For example, in embodiments, the user imaging device used to capture a digital image transmits the captured digital image to the remote image validation module 18 directly (e.g. via the internet, via an MMS, via a mobile network, etc.). Additionally or alternatively, the user imaging device transmits the captured digital image to the remote image validation module 18 indirectly, by, for example, transmitting the image to the user transaction device 12 (e.g. via Bluetooth® or short range communication), such that the user transaction device 12 forwards the image directly or indirectly to the remote image validation module 18 itself. The user imaging device(s) also communicate directly or indirectly as necessary with the relying party described below.

The relying party system 14 in system 10 is the entity that requires strong user authentication to perform some action such as authorising a transaction, signing a transaction, granting a privilege to the user or similar. Typically the relying party uses a web server to communicate with the user (via his transaction device 12) through an internet browser. When required, the relying party system 14 sends an authentication request to the trusted party system, and specifically to the image validation module 18. The authentication request may also feature a challenge to bind the authentication request to a particular session, or to some data that the user needs to authenticate. The authentication challenge (also referred to as a transaction message M herein) is forwarded to the user transaction device 12 in plain text or embedded in a QR code or in other formats. Additionally or alternatively, the challenge/message M may be generated by the user transaction device 12 itself. In any case, in order to process the transaction, the relying party requires an authentication response from the user. The authentication response is provided to the relying party by the image validation module 18 upon receipt by the image validation module of the image $P_M$ captured by the user using the imaging device 16, and verification of the image by the image validation module.

In a typical scenario, the user will initiate a transaction using the user transaction device 12. The transaction device 12 comprises a display 12a and an operating system 12b. Initiating the transaction causes the device 12 to either generate locally, or receive from the relying party system 14, an authentication challenge in the form of a transaction message M. The message M is a message, document or purchase order associated with the transaction. If the message is received from the relying party, it originates from the web server 14a used to perform the online transaction. The transaction message M is displayed on the display 12a of the transaction device 12 so that the user can inspect the message and ensure it corresponds to the transaction he is attempting to perform. The message M may, for example, be presented on a browser running on the transaction device 12, where the browser receives web HTML pages from the remote web server 14a controlled by the relying party. Since the communication channel between the transaction device 12 and the relying party system 14 may not be secure, the user typically cannot commit to the message on the transaction device (i.e. he cannot securely complete the transaction), because an attacker may replace the message M with a fraudulent message during communications between the transaction device 12 and the relying party 14. Separately, the relying party system 14 sends a copy of the transaction message $M_{copy}$ to a trusted party system, and specifically to an image validation module. I is necessary for the validation system to have the copy of the message $M_{copy}$ so that the validation can be performed.

In order to proceed with the transaction and complete the authentication challenge, the user uses the imaging device 16 to capture an image of the message M that is displayed on the display 12a of the transaction device thereby provided actual WYSIWYS functionality. The imaging device 16 is a computing device (e.g. a PC, mobile computing device, laptop, smartphone, tablet PC, etc.) having a digital camera, and is used by the user to capture a digital image of M (referred to herein as $P_M$). The imaging device 16 is separate to the transaction device 12. The imaging device 16 comprises a digital camera module 16a and a communication stack 16g. The imaging device 16 further comprises a processor coupled to program memory storing computer program code to implement the image capture and image transmission functions of the device, to the digital camera module 16a, to working memory and to interfaces such as a screen, keyboard, mouse, touchscreen, the communication stack 16g, and network interface.

The processor may be an ARM® device or other similar device by another manufacturer. The program memory, in embodiments, stores processor control code to implement functions, including an operating system, various types of wireless and wired interface, storage and import and export from the device. The imaging device 16 comprises a user interface to enable the user to capture images and transmit them to the image validation module 18. A wireless interface, for example a Bluetooth®, Wi-Fi or near field communication (NFC) interface may be provided for interfacing with other devices.

The digital camera module 16a of the user imaging device 16 comprises an optical system 16b, pixel sensors 16c, an analogue-to-digital convertor 16d and a post-processing and compression module 16e. The digital camera module 16a is coupled to the communication stack 16g so that images captured by the module 16a may be transmitted to the remote trusted party system, and specifically to the image validation module 18. The optical system 16b is the first subcomponent of the digital camera module 16a that light hits when capturing an image of message M. The optical system 16b typically comprises a lens, which may be variable to focus light. The pixel sensors 16c is the second subsystem of the digital camera module 16a and generally comprises a matrix of millions of pixel sensors which output a value dependent on the brightness of the image signal received at each sensor's specific location. The pixel sensors are typically behind a colour filter array which is used to separate the different primary colours (red, green, blue) of the full colour image of message M. The A/D converter 16d is used to sample the voltage values collected by the pixel sensors to provide a digital signal. The post-processing and compression module 16e may be part of the digital camera firmware, to process the digital signal output by the A/D converter 16d to apply correction techniques to the image (e.g. colour correction, filtering, adjustment, etc.), and to format a digital image output file such .gif or .jpg or .jpeg or similar.

Preferably, the imaging device 16 is able to connect to the remote trusted party system by a particular communication channel (e.g. via the internet or via a multimedia messaging service) to enable automated transmission of the captured image to the image validation module 18. Thus, once the user has used the imaging device 16 to capture an image of the message M displayed on the display of the transaction device 12, the digital camera module 16a provides the captured image $P_M$ to the communication stack 16g for it to be transmitted to the image validation module 18 for validation.

Preferably, a software application is installed on the user imaging device 16 to help automate the capture and compression of the image $P_M$, and to establish a communication channel with the remote image validation module 18 in order to send over a network a request to validate the captured digital image. Optionally, this request may comprise additional information such as a serial number of the user imaging device 16 (to verify the image against a given device), where the serial number of the device is stored in image validation module 18 during the device registration process. The request may optionally comprise a cryptographic nonce (i.e. an arbitrary number) to avoid replay attacks, and other data to help strengthen the security design of the solution such as:
  a one-time-password derived from open standard such as RFC 6238 or RFC 4226 or similar,
  a hash message authentication code (HMAC) as used in HTTP-based authentication as in RFC 2069 or similar, or
  a challenge request based on a challenge/response algorithm based on RFC 6287.

The image validation module 18 provides a validation and authentication service and is part of the remote trusted party system. The image validation module 18 is a central component of system 10 as it comprises the image processing capability required to provide the validation functions of the invention. The image validation module 18 is, in embodiments, a server operating some software to perform the validation. Preferably, the security sensitive operations of such image validation or authentication are processed within the tamper-resistant environment of a Hardware Security Module (HSM) to avoid any eavesdropping from an attacker and to prevent a response from being counterfeited by a rogue administrator. Therefore, only a breach of the image validation module can result in confidential information being made available outside the image validation module, which consequently must be prevented using tamper resistant hardware designed for the purpose (such as the IBM 4765, Thales nShield, SafeNet ProtectServer, Utimaco SafeGuard CryptoServer, Utimaco CryptoServer, Safenet Luna or Protect server products, HP Atalla, Bull TrustWay, Crypt2Pay or Crypt2Protect). The image validation module may be further protected both by a firewall and by physical security to prevent, reduce or deter unauthorised access.

The image validation module 18 comprises a data store 18a, which stores images received from imaging devices, image device fingerprints and may include other data to help perform the validation and authentication processes. The image validation module 18 comprises an image processing module 18b which is used to perform any one or more of the three above-mentioned image processing techniques to analyse an image received from a user imaging device 16. In embodiments, the image processing module 18b comprises three sub-modules to perform the image processing techniques:
  (a) Uniquely linking the received image to the imaging device—the ballistics sub-module 18e computes the PRNU reference fingerprint of each imaging device 16 during the registration process to register the device in the system 10. The ballistics sub-module 18e also computes the PRNU image fingerprint for an image received from an imaging device 16, and compares the computed fingerprint against the reference fingerprints stored within the image validation module 18 to determine if the image has been received from a registered device.
  (b) Ensuring the image received by the remote trusted party is genuine—the forensics sub-module 18d analyses an image received from a user imaging device 16, and confirms whether or not digital image manipulation has been performed on the image, thereby determining if the received image is genuine. In embodiments, the forensics sub-module 18d may only be initiated if in step (a) it is confirmed that the image originates from a registered device.
  (c) Ensuring the transaction data in the received image is genuine—the OCR sub-module 18b extracts text characters contained within the images received from a user imaging device 16. The relying party system 14 sends a copy of the transaction message $M_{copy}$ to the image validation module 18 (either automatically when a transaction message M is created, or on request from the image validation module when it is analysing an image). In embodiments, for efficiency, the OCR sub-module 18b may only be initiated to extract text and compare the extracted text from M with the copy $M_{copy}$ received separately from the relying party if in step (b) it is found that the image has not been tampered with/manipulated.

Optionally, the image validation module 18 may further comprise a barcode reading module 18g, which is able to read barcodes (e.g. a two-dimensional barcode, quick response (QR) code, or colour codes as described in EP1959374A1).

The image validation module 18 may be used in combination with other forms of authentication such as static and/or dynamic passwords, and/or challenge-response algorithms such as OATH OCRA, EMV CAP, Visa CodeSure or Vasco Vacman, and/or digital signatures.

The image validation module 18 further comprises an apparatus engine 18*f*, which is configured to receive images and requests for validation from user imaging devices 16. The apparatus engine 18*f* is configured to communicate with an engine 14*b* of a relying party's system 14 to, for example, obtain a copy of the transaction message $M_{copy}$ from the relying party directly, and to provide the relying party with the authentication response to the authentication challenge if $P_M$ is authentic.

When an image $P_M$ is received by the image validation module 18 (via the apparatus engine 18*f*), the image processing module 18*b* is configured to perform one or more of the above-described image processing techniques. At the end of the processing, the image validation module creates a response which states (a) if the imaging device which created $P_M$ has been recognised (i.e. is a registered device), (b) if the received image $P_M$ is believed to be unaltered, and optionally (c) if the textual content of $P_M$ matches the textual content of $M_{copy}$. If all of (a) to (c) are affirmative, the image validation module 18 concludes without much doubt that the user of the recognised imaging device 16 has explicitly approved the genuine transaction message M. He has indeed captured $P_M$ using his imaging device 16 which is therefore determined to be in his possession, $P_M$ is also believed to be trustworthy, and $P_M$ features the original message M as expected by the relying party (i.e. M matches $M_{copy}$). Optionally, the image validation module 18 could store and/or timestamp the $P_M$, or an encrypted version thereof, for cases of dispute. Optionally the response could also include either identification of the user registered for the identified user imaging device or a confirmation that the image originates from a device belonging to a particular user. Alternatively, the image validation module may return an identifier of the user imaging device and the relying party will then have to decide if this device belongs to the correct user.

Figure 2:
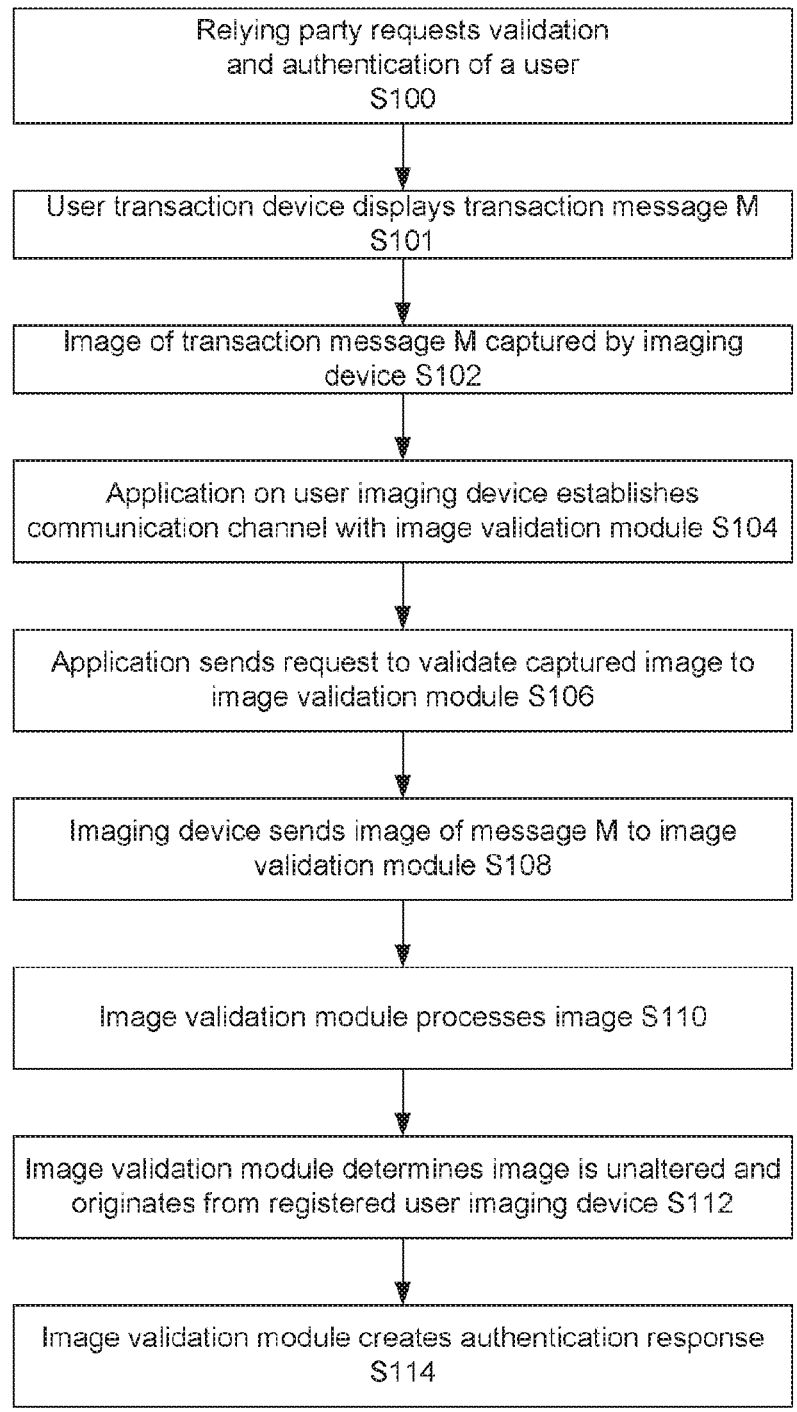
FIG. 2 illustrates a flow chart of example steps to authenticate and validate a transaction.

FIG. 2 illustrates a flow chart of example steps to authenticate a user device and a transaction using the system of FIG. 1. A user is required to register in the system. The user owns two devices: a user imaging device and a user transaction device. The user imaging device is also registered in the system. In embodiments, only the user imaging device is registered in the system as only it communicates with a validation module. In particular embodiments, the user transaction device may receive a captured digital image from the user imaging device and transmit it to the validation module itself. However, since the validation and authentication of a digital image is based on the device used to capture the image, the user transaction device may not need to be registered.

Registration of the user imaging device involves a unique fingerprint associated with the user imaging device to be stored within the image validation module. The unique fingerprint for the user imaging device is obtained via image processing techniques in which analysis of artefacts within digital images captured by the device enable the imaging device to be identified. This is described in more detail below. Thus, a unique fingerprint is associated with each user imaging device registered in the system to enable the device to be authenticated. Furthermore, each user imaging device is linked with its user (who is also registered in the system), such that there is a relationship binding user and user imaging device within the system.

During a transaction process, a relying party requests validation and authentication of a transaction to be performed between the user and the relying party (S100). An authentication challenge is generated which must be completed in order for the transaction to be processed and finalised. The challenge is in the form of transaction message M, and is either generated locally by the user transaction device, or is received by the user transaction device from a third party (e.g. the vendor, online banking service, etc.). The transaction message M is displayed on the transaction device for the user to view and check before completing the transaction (S101). If the user is satisfied that the message M corresponds to the transaction he was attempting to perform on his transaction device, he proceeds to the next stage of the transaction; otherwise he cancels the transaction. The user imaging device is used to capture an image of the transaction message M displayed on the transaction device (S102). A software application running on the user imaging device is initiated to establish a communication channel directly or indirectly between the imaging device and a remote image validation module of the system (S104).

Once the channel is established between the imaging device and remote imaging validation module (either directly or indirectly, as mentioned earlier), the application sends a request to the image validation module for the captured image to be validated (S106). The image validation module preferably determines that the image is received from a device which is already known to it (i.e. has been registered), and the image received from the device comprises the unique fingerprint associated with the device. Thus, the request may include data to identify the user imaging device so that the image validation module can find the appropriate data (e.g. the unique fingerprint data) stored within the module to help authenticate the device. The imaging device (via the application) sends the captured image of the message M to the image validation module (S108). If the image appears to originate from a device which is registered, the image validation module then applies image processing techniques to the received image of message M (S110) to determine if the artefacts in the digital image match the unique fingerprint associated with the device. If the fingerprint of the received image generated by the image processing techniques match the stored unique fingerprint associated with the device, then the image validation module determines that the image has not been altered and originates from the registered user imaging device (S112).

The image validation process also involves checking if the content of the message M received in the image is the same as that expected by the relying party. As explained earlier, this may involve comparing the message M in the received image with a copy of the original message $M_{copy}$ received directly from the relying party. The message M is extracted from the received image using optical character recognition image processing techniques. If the image validation module determines that the extracted message M matches the copy of the original message $M_{copy}$, then it is configured to send a response to the authentication challenge to the relying party in order to process and complete the transaction (S114).

Figure 3:
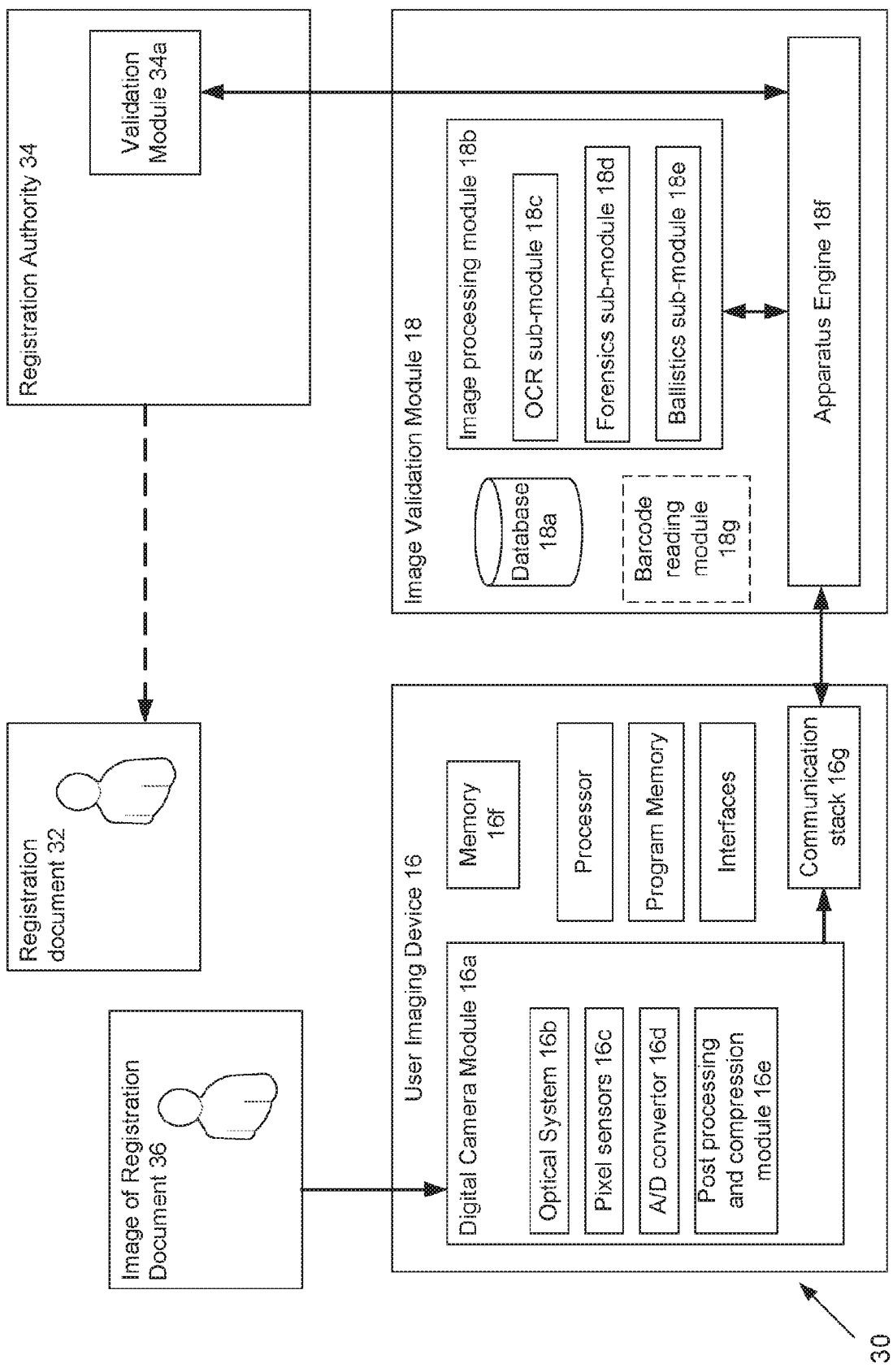
FIG. 3 shows a block diagram of the system of FIG. 1 adapted to register a user imaging device.

FIG. 3 shows a block diagram of the system of FIG. 1 which is adapted to register a user and a user imaging device. Generally speaking, the user provides something he knows or owns, such as a static password, ID card or fingerprint, together with something he has, such as an imaging device, to enable the registration. While the user's transaction device may be unsecure, and not linked to the user or the apparatus in any way, embodiments of the invention require that the imaging device, or more precisely the digital camera module (either embedded or attached to the imaging device), is recognised as something that the User has in order to meet the second requirement for strong authentication.

The system 30 of FIG. 3 comprises many of the same features as that of FIG. 1, as indicated by the use of the same reference numerals. FIG. 3 is merely an example of how the registration can be performed and is not limiting. The image validation module is configured to communicate with a registration authority 34. The registration authority 34 issues registration documents 32 which could be identification documents such as driving licences, national ID cards, passports, etc. but could just be a letter or similar document.

The registration document 32 may have a plurality of pages and images can be captured for each page. Alternatively, multiple registration documents 32 may be used. To register a specific user's imaging device 16 in the system, the imaging device 16 captures a plurality of images, e.g. an image of each registration document 32 or each page thereof. The captured images 36 are then processed by the digital camera module 16a of the imaging device 16 as described earlier, and the compressed images are sent to the image validation module 16. The image validation module performs the above-described image processing techniques in order to generate a unique reference fingerprint for the imaging device 16, based on the received captured images 36. Textual data in the captured image 36 may also be extracted in order to compare the extracted text with the text of the registration document 32 (as received from the ID issuing authority 34). If the extracted text matches the original text, the image validation module determines that the image 36 is a genuine image of the registration document 32, i.e. that it has not been tampered with. The reference fingerprint is then stored in the image validation module and linked with the user. Additional information associated with the imaging device 16 may also have been transmitted with the captured images, such as a serial number or other identifier, and this may also be stored alongside the reference fingerprint and user information.

Figure 4:
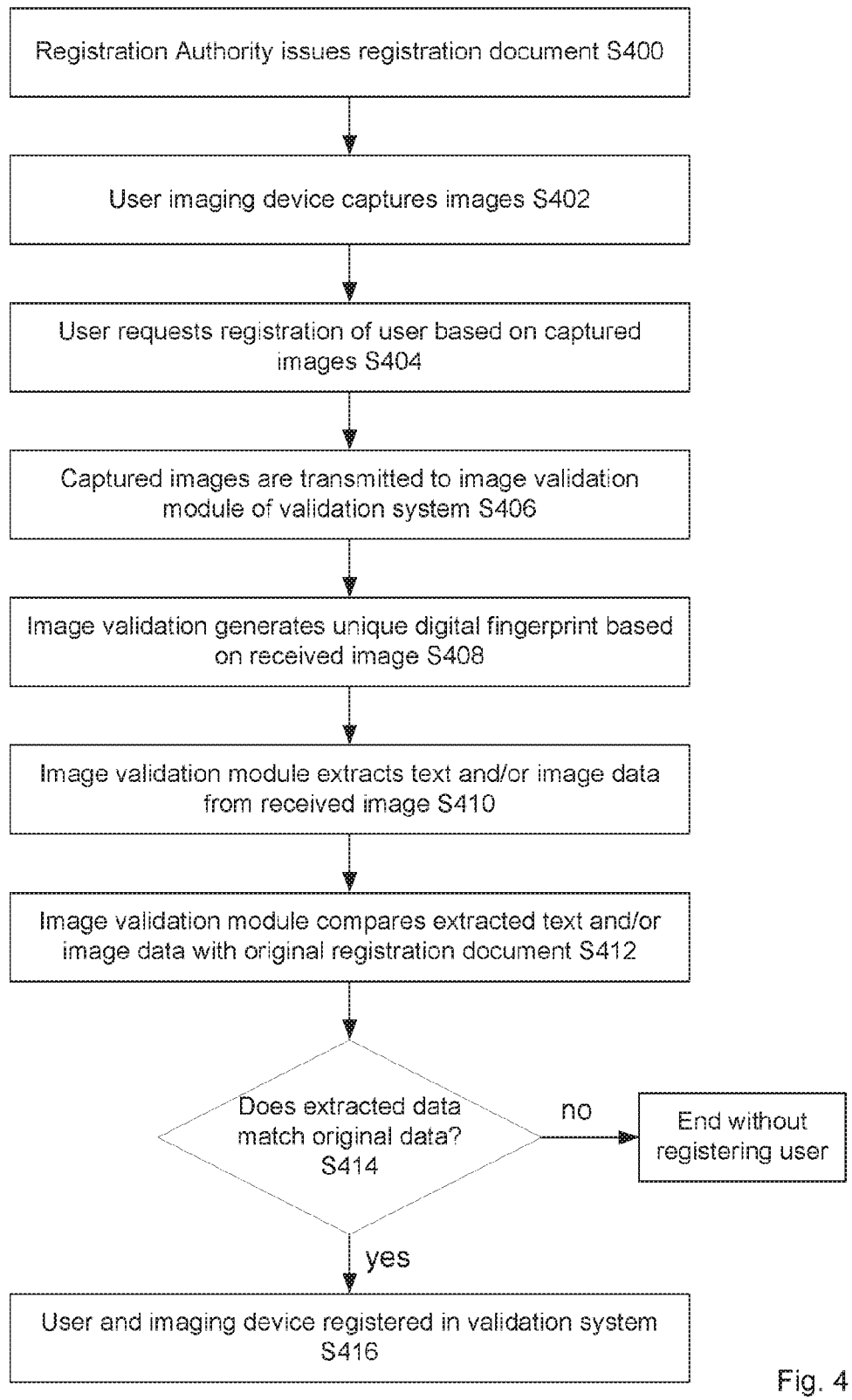
FIG. 4 illustrates a flow chart of example steps to register a user imaging device.

FIG. 4 illustrates a flow chart of example steps to register a user imaging device. The issuing authority issues an official registration document (S400) for a particular user to the user and the image validation module. The user is prompted to use his imaging device to capture a plurality of images based on the registration document (S402). The captured images are used by the image validation module to generate a unique fingerprint for the imaging device. The user may be prompted by an application on the imaging device to send the captured images to the image validation module. Additionally or alternatively, the captured images may be transmitted automatically. In either case, the user requests registration of himself with a particular imaging device based on the captured images (S404). The captured images are transmitted to the validation system, specifically to the image validation module (S406).

The image validation module processes the received images in order to generate the unique fingerprint (S408) and to extract text and/or image data from the received images (S410). The extracted text and/or image data is compared with the original document received by the image validation module from the registration authority (S412). Additionally or alternatively, the extracted data is sent to the registration authority to verify that the data matches the data on its system, and the registration authority generates a response confirming that the data matches the original data and sends this back to the image validation module. In either case, if the data matches that within the original document (S414), the user is validated as a genuine, known user, and both the user and imaging device information (including the fingerprint) are stored within the validation system to enable future transactions performed by the user to be authenticated via the system (S416). Otherwise, the registration process terminates and the user is not registered in the validation system.

FIG. 5 is a sketch of a system to process images captured by a user imaging device to generate a fingerprint for that device during the registration process. A user imaging device 52 comprises a digital camera sensor 52a and image acquisition software 52b, which are used to capture multiple images 52c of a particular 'enrolment scene'. For the imaging device 52 to be uniquely identified, a camera ballistics algorithm is executed on an image, or preferably several images, captured by the imaging device in order to extract a unique device reference fingerprint allowing for future device identification. The captured image(s) 52c of the enrolment scene are transmitted to the image validation module 50 for processing. The image validation module comprises the received captured images 50a, an image processing algorithm 50b (e.g. a ballistics algorithm) to extract a unique representation of the PRNU noise in the captured images, and a PRNU noise data file 50c for the imaging device 52 (or specifically, for the sensor 52a of the imaging device).

In an embodiment, the unique fingerprint will be computed using the captured images of an enrolment scene in order to obtain an approximation to the PRNU noise, by averaging the images to suppress random noise components and low frequency components to only retain the PRNU noise. Preferably, the fingerprint computation process is performed by the image validation module 50 so that the imaging device fingerprint is never exposed. Consequently, the fingerprint computation processing is ideally performed inside tamper evident hardware such as a HSM, so that the fingerprint is not exposed to attacks.

Optionally, the fingerprint extraction algorithm may implement unique features, and could for instance be decorated in disjoint regions of the sensor to thwart potential brute force attacks.

The ballistic algorithm may be updated days, months or years after the initial enrolment process (in which case the initial images would need to be stored in the image validation module 50 and re-processed to generate a new fingerprint using the updated algorithm).

Figure 6:
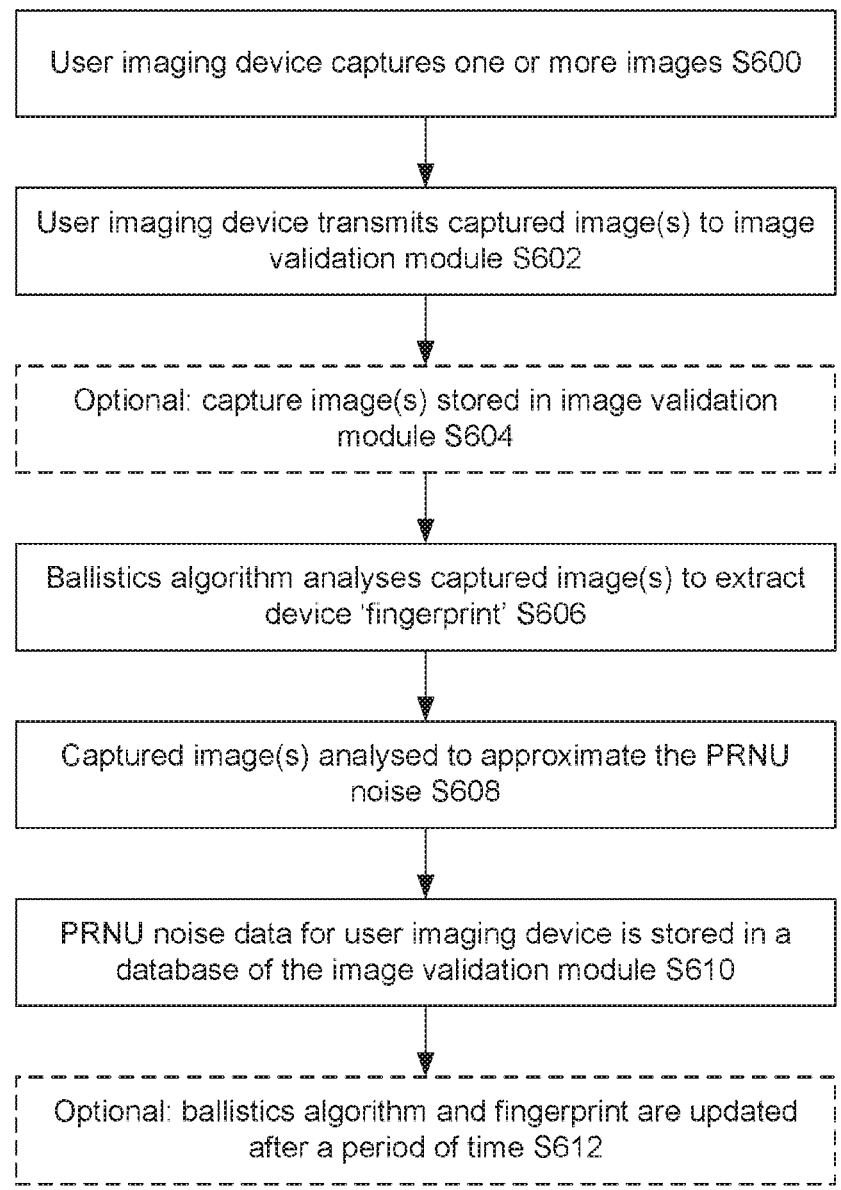
FIG. 6 shows a flow chart of example steps to process images captured by a user imaging device to generate a fingerprint for the device.

FIG. 6 shows a flow chart of example steps to process images captured by a user imaging device to generate a fingerprint for the device. The user imaging device is used to capture one or more images of an enrolment scene (step S600). In the above-described embodiments, the enrolment scene may be the user ID document. The imaging device transmits the captured images to the image validation module for analysis (S602). Optionally, the captured images are stored in the image validation module (S604), in case the image processing algorithms are updated in the future and the fingerprint needs to be regenerated. The image processing algorithm is a ballistics algorithm which analyses the captured image to extract a unique fingerprint for the imaging device (S606), as described earlier. The process is shown in more detail in steps S608 and S610. The captured images are analysed to approximate the PRNU noise (S608) and this noise data is stored in a data store within, or coupled to, the image validation module (S610). The stored noise data or reference fingerprint is used to determine if the captured images received by the image validation module as part of an authentication challenge are genuine and comprise a known fingerprint. Optionally, the ballistics algorithm is updated after a period of time, and the stored captured images are used to update the fingerprint for the associated imaging device (S612).

Thus far, methods and systems which exploit image processing technology to strongly authenticate a user's device, and to also verify the transaction data integrity, have been described. The methods and systems require two user devices and an image validation module to achieve the WYSIWYS functionality described earlier.

It is now explained how the above-described methods and systems can be coupled with a public key infrastructure (PKI) in which a user digitally signs a message using asymmetric cryptography. In PKI systems, the user keeps full control over a private key used to sign a message, and a corresponding public key is used during verification of the signature. Examples of such systems are RSA, DSA and ECDSA. Though the PKI system is widely used, it often remains a challenge to demonstrate compliance against key requirements of the European Directive on Electronic Signatures [Directive 1999/93/EC] and the European Parliament Regulation on Electronic Identification and Trust Services (http://eur-lex.europa.eu/legal-content/EN/TXT/?uri=uriserv:OJ.L_.2014.257.01.0073.01.ENG) in which an Advanced Electronic Signature needs to be: i) uniquely linked to the signatory; ii) capable of identifying the signatory; iii) created using means that the signatory can maintain under his sole control; and iv) linked to the data to which it relates in such a manner that any subsequent change of the data is detectable.

As mentioned earlier, it is possible to exploit protocol and software vulnerabilities to alter a message M displayed to a user, and also use the user's private key without his consent. In practice, most users do not have trusted display devices available to them to complete signature operations, and must use the keyboard/touchscreen of their computing devices to authenticate themselves to the signature creation device, where both the keyboard and touchscreen are vulnerable to key logger attacks. Given that both the message display and user authentication are relatively weak, one can argue that one or all criteria for an advance electronic signature are not fully met. This also applies to Qualified Electronic Signatures, which as defined in the European Directive mentioned above are advanced electronic signature supported by a qualified certificate and generated using a secure/qualified signature creation device.

In international patent application WO2014/199128, which is incorporated herein by reference in its entirety, the applicant described a method and apparatus for requesting and providing a digital signature. Central to this concept is the interaction with first and second user devices, where the two devices are preferably separate from one another. The request for a signature is received from the first user device and is confirmed from the second user device before the signature is created. Moreover, the validation challenge is generated so that the message can be recreated on the second user device in order that a user can see the message before confirming the signature request. Accordingly, the "What You See Is What You Sign" (WYSIWYS) functionality is provided.

Turning now to FIG. 7, this shows a flow chart of the steps taken by various devices in the system of FIG. 1 to generate a digital signature in a public key infrastructure. A public key infrastructure (PKI) includes an arrangement for creating, managing, distributing, using, storing, and revoking digital certificates. The PKI binds public keys with respective user identities by means of a certificate authority (CA). A separate validation authority (VA) can provide this information on behalf of the CA. The binding is established through the registration process, which may be carried out by software at a CA. The PKI comprises a registration authority (RA), which ensures that the public key is bound to the individual to which it is assigned in a way that ensures non-repudiation.

Figure 7A:
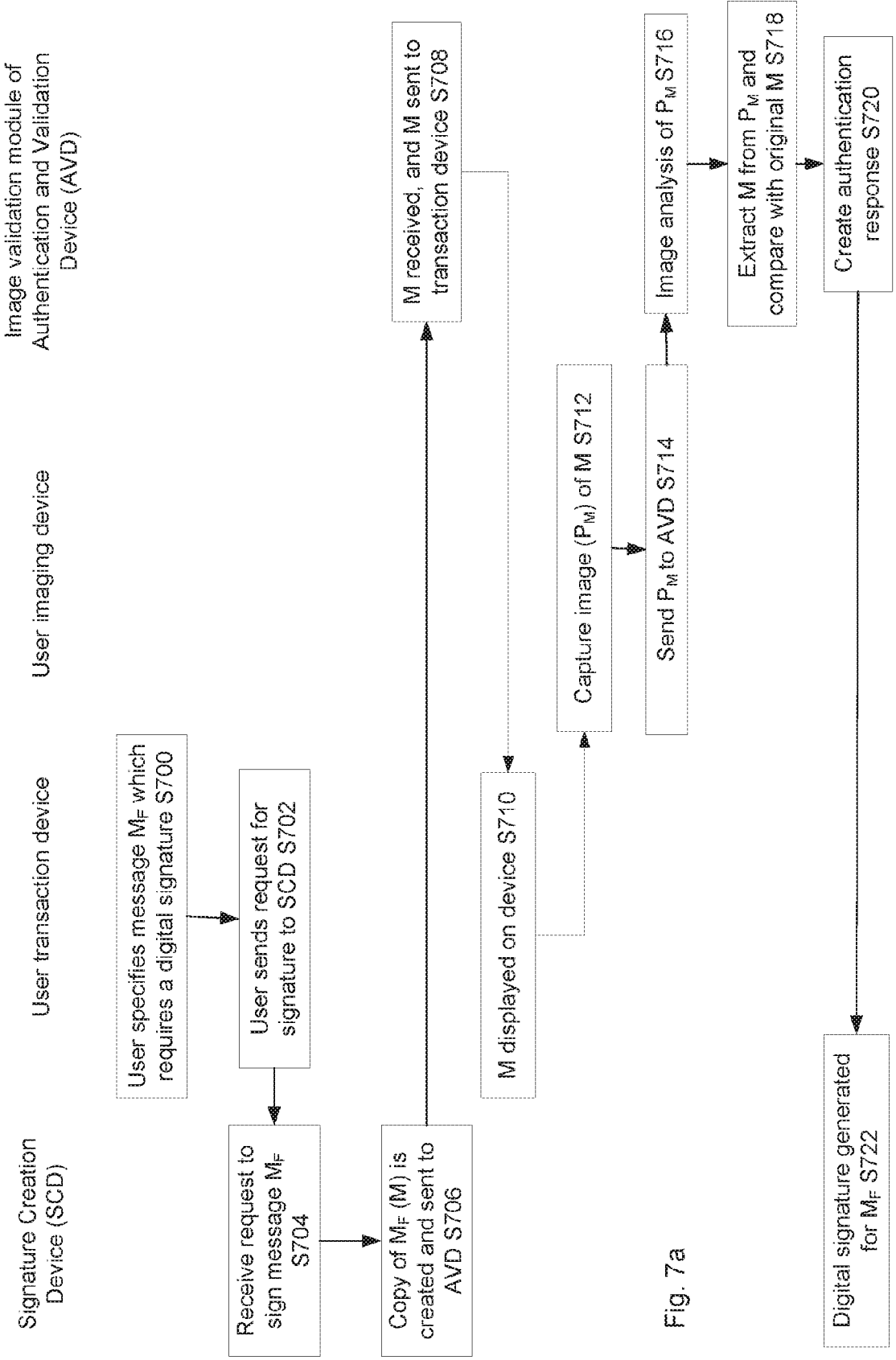
FIG. 7a is a flow chart of the steps taken to authenticate a digital signature in a public key infrastructure.
Figure 7B:
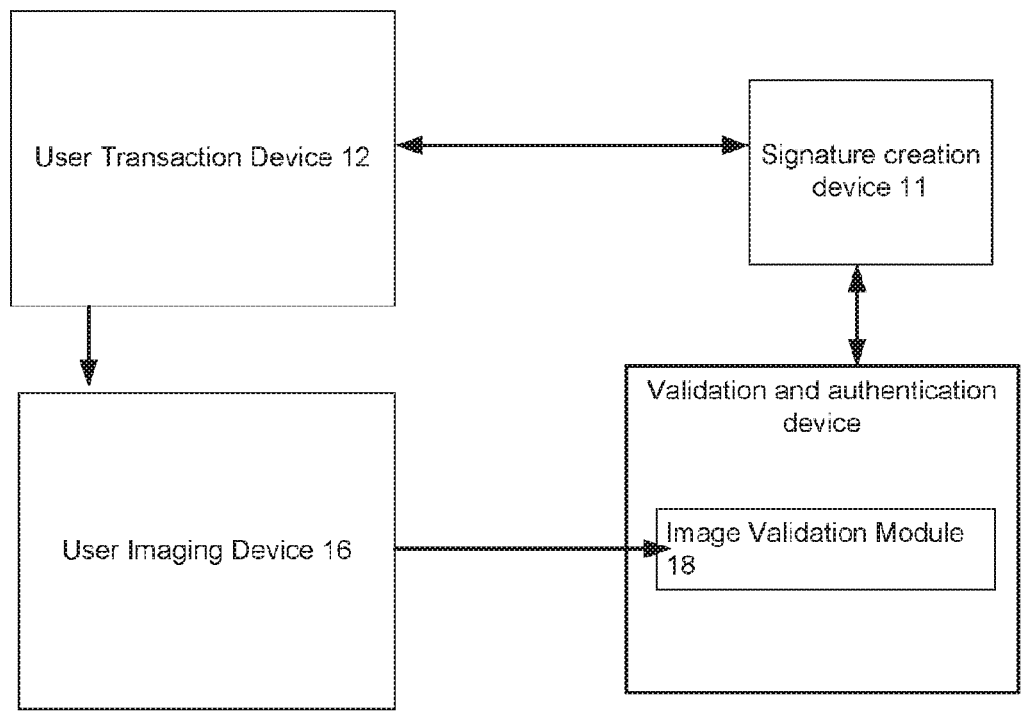
Figure 7C:
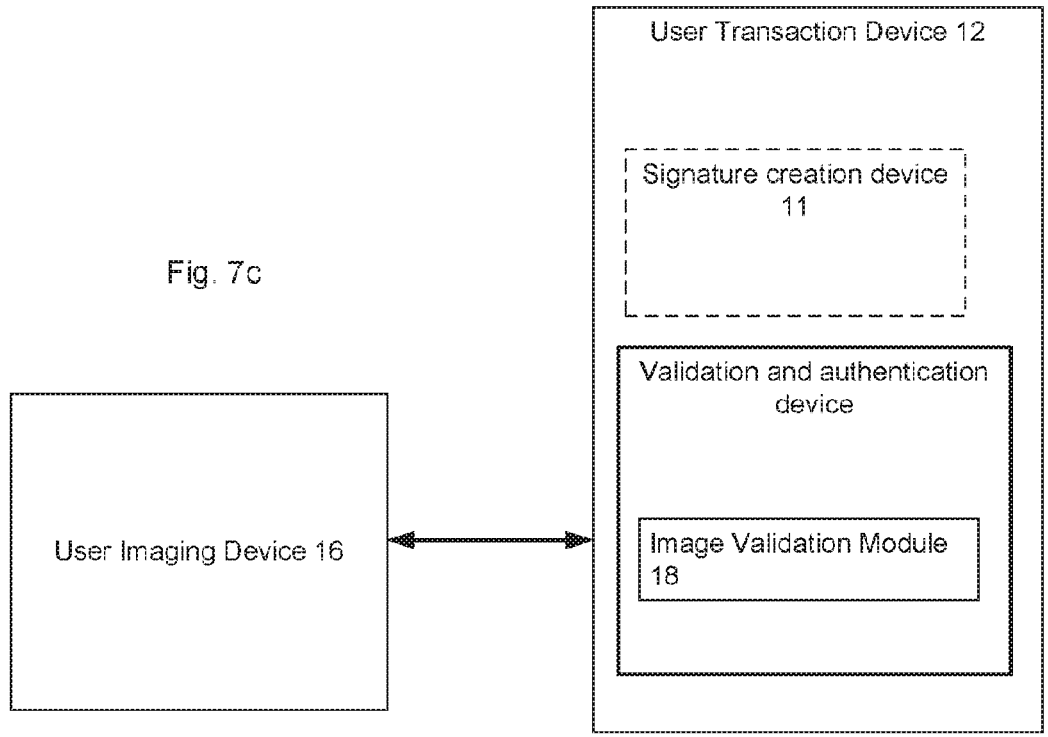

FIGS. 7a to 7c shows how embodiments provide strong 'WYSIWYS' functionality using multiple devices. The system comprises four key devices: a signature creation device (SCD) 11, two devices held by a user, i.e. the transaction device 12 and the imaging device 16 described earlier, and a authentication and validation device (AVD) (which comprises the image validation module 18 described earlier). FIGS. 7b and 7c are simplified versions of FIG. 1 showing two arrangements of these devices. The signature creation device is where the digital signature generation is carried out. The signature creation device may be a central SCD such as a signing server as shown in FIG. 7b, or a local signature creation device such as a smart card or a signing stick as shown in FIG. 7c. Moreover, as shown in FIG. 7c, for a local SCD, the authentication and validation device may also be incorporated in the user transaction device or as an integral part of the SCD. As shown in FIG. 7c, there is a communication channel between the user imaging device and the local SCD. For example, this communication channel may be formed when connecting the imaging device to a user's local computer for synchronisation and recharging. This connection could be used to communicate the picture. Bluetooth or Bluetooth Low Energy (BLE) are alternatives. The advantage of this solution is that then the central server is avoided when making a signature locally.

As previously described, the user's transaction device may be any electronic device such as workstation, a laptop computer, a tablet or smart phone, while the user's imaging device may be any electronic device having a digital camera/image capture functionality as well as the ability to communicate with the AVD either directly or indirectly.

In FIG. 7b, the image validation module/device is part of a remote, centralised system to perform validation and authentication. There are two independent communication channels, one between the SCD and the image validation module, and another between the imaging device and the image validation module, to achieve WYSIWYS with an adequate level of security to avoid the message being altered without instant detection. If only one user device was used, it would have to have additional tamper resistant features, such as a trusted GUI (Graphical User Interface).

Initially, at step S700, the user uses the transaction device to identify a specific message $M_F$ that he is prepared to commit to with a digital signature. The message may be a transaction, document or purchase order in electronic form.

As the transaction device may be an insecure platform, the user typically cannot commit to signing the message on this device because an attacker on the transaction device may replace the message with another one. Thus, once the user has accepted the message $M_F$ and wishes to sign the message, a request for signature creation is sent from the transaction device to the signature creation device (S702). In FIG. 7c, the SCD is part of the transaction device (although as indicated by the dashed lines, it may be removable part of the transaction device). Accordingly, step S702 and S704 are omitted in this arrangement.

Once the SCD has received a request to sign a message $M_F$ (S704), the SCD will not create the signature until it has received evidence that the user has committed to signing this particular message, and that the message is authentic. In essence, this is achieved by requiring an authentication challenge to be completed by the user. For both the local and remote arrangements, a copy of the message, M, is created in embodiments by the SCD, which then passes the copy M to a authentication and validation device (AVD) (Step S706). Preferably, the image validation module described earlier is part of the AVD. M is sent to the user's transaction device for display by the AVD (S708). To complete the authentication challenge, the user is prompted to use his imaging device to capture an image of M (which is displayed on his transaction device (S710)), and transmit it to the image validation module of the AVD for validation. Thus, at step S712, an image $P_M$ of the message M displayed on the transaction device is captured by the imaging device. The captured image is sent to the image validation module of the AVD server (S714).

The captured image is a type of validation challenge. By analysing the captured image to determine that it is genuine and that it comprises the unique fingerprint associated with the imaging device, assurance can be provided to the SCD that this message has been approved by the user and comes from a trusted source, with acceptable reasons to believe that it has not been altered before being presented to image validation device. The image validation module extracts an image fingerprint from $P_M$, compares the extracted fingerprint to a reference fingerprint associated with the imaging device and determines if $P_M$ has been obtained from a trusted, known imaging device (S716). The image validation module then extracts the original message M from $P_M$ and compares this with the message M received directly from the SCD (S718). If the messages match, the image validation module of the AVD outputs a validation response (S720). In the remote arrangement of FIG. 7b, the response is sent securely to the SCD. In the local arrangement, the SCD and AVD are within the transaction device and thus validation takes places locally. In both arrangements, the SCD is assured that the user is valid. The SCD therefore generates the requested signature to sign the message $M_F$ on the transaction device. Thus, the image processing techniques performed by the AVD ensure that the signature can only be generated if this image validation has been successful.

The innovation allows for a number of realisations depending on whether the SCD is a central signing server as shown in FIG. 7b or a local device (smart card, USB signing stick) as shown in FIG. 7c. In the latter case various realisations for verifying the unique validation code are possible.

FIG. 8 illustrates a detailed flow chart of example steps to authenticate a digital signature in a public key infrastructure using multiple devices. This arrangement comprises the user devices and the image validation module described above with respect to FIGS. 1 and 7. The user devices are independent of one another and provided as separate devices as part of the authentication functionality. The image validation module is part of the authentication and validation device. The image validation module may be located remotely from the user devices. The image validation module is able to communicate with the user imaging device and with the SCD. Accordingly, the imaging device and the SCD each have a separate independent communication channel with the AVD (and therefore, with the image validation module).

In FIG. 7, the signature creation device (SCD) and the authentication and validation device (which comprises the image validation module) are shown as two separate entities which are connected to each other, preferably via a secure connection. This merely indicates that each entity has a different function or role in the process. It will be appreciated that the separate functions of the signature creation device and the authentication and validation device may also be provided by a single entity, e.g. a single signature server.

Initially, the user agrees on the content of and accepts a message $M_F$ which is being displayed on his transaction device (S800). Acceptance means that he is prepared to commit to the message with a digital signature. The message $M_F$ may optionally be presented on a client browser of the transaction device which is receiving web HTML pages from a remote web server controlled by an application provider.

The user contacts the SCD or signature server to request a signature for message $M_F$ or a hashed version thereof (S802). A version of the message, termed M, is created. M may be identical to $M_F$, or may be a version based on $M_F$ having essentially the same content. $M_F$ may for instance be a purchase order and M would be a summary thereof with e.g. the PO reference, recipient, amount. As shown by steps S804a, S804b, S804c, M is computed by the transaction device, the SCD or the authentication and validation device (AVD). Regardless of where it is created, there is communication between the central SCD and the AVD to ensure that the AVD ultimately receives M (S806).

As indicated in S808, as part of a validation challenge, the message M is displayed on the user transaction device. As described earlier, the user is required to capture an image of M using his separate imaging device. The message M may be a standardised quick response (QR) Code or similar barcode which can be imaged by the imaging device, and which can be read by the AVD to extract data from the message that allows the message to be authenticated. Additionally or alternatively, M may comprise user-readable portions which enables the user to read message M on his transaction device and visually verify that it matches the message $M_F$ that he is committed to sign, before he takes the next steps to complete the validation challenge (i.e. capture an image of M). For example, if $M_F$ is a purchase order, M could be a summary thereof with information in important fields e.g. PO reference, recipient, amount; the user would be presented with the information from the fields to identify $M_F$. If the user is satisfied that M relates to $M_F$, he captures an image of M using his imaging device (S810). The capture image $P_M$ is sent to the AVD for authentication—specifically, it is sent to the image validation module of the AVD to apply image processing techniques to perform the validation/authentication (S812).

In step S814, if the AVD determines that $P_M$ has been received from a known imaging device (by comparing fingerprints, as explained earlier), and that the message extracted from $P_M$ matches the original message M received by the AVD (in step S806), then a validation response is generated and sent to the SCD. The SCD is then prompted to create the requested digital signature and the original message $M_F$ is signed (S816). If step S814 fails, the process ends without signing $M_F$.

In embodiments of the invention, the image processing techniques used to perform authentication and validation are coupled with a PKI infrastructure, to enable image processing technology to create a mobile trusted Registration Authority for self-enrolment against a centralised Certificate Authority provided the user is already enrolled in the central validation and authentication system. Currently one of the most difficult challenges for wide deployment of PKI is to ensure trustworthy user enrolment and registration so that the certificates issued can be granted trust and be recognised as effectively belonging to the person claiming its ownership. In particular Annex II of the European Directive on Electronic Signature mandates that certificate service providers verify, by appropriate means in accordance with national law, the identity and, if applicable, any specific attributes of the person to which a qualified certificate is issued, and employ personnel who possess the expert knowledge, experience, and qualifications necessary for the services provided, in particular competence at managerial level, expertise in electronic signature technology and familiarity with proper security procedures. They must also apply administrative and management procedures which are adequate and correspond to recognized standards. Traditionally, registration authorities check official ID documents such as national ID card, passport, driving license or insurance cards before issuing a certificate. Optionally they may also call a central service to verify the validity of the official document.

Figure 9:
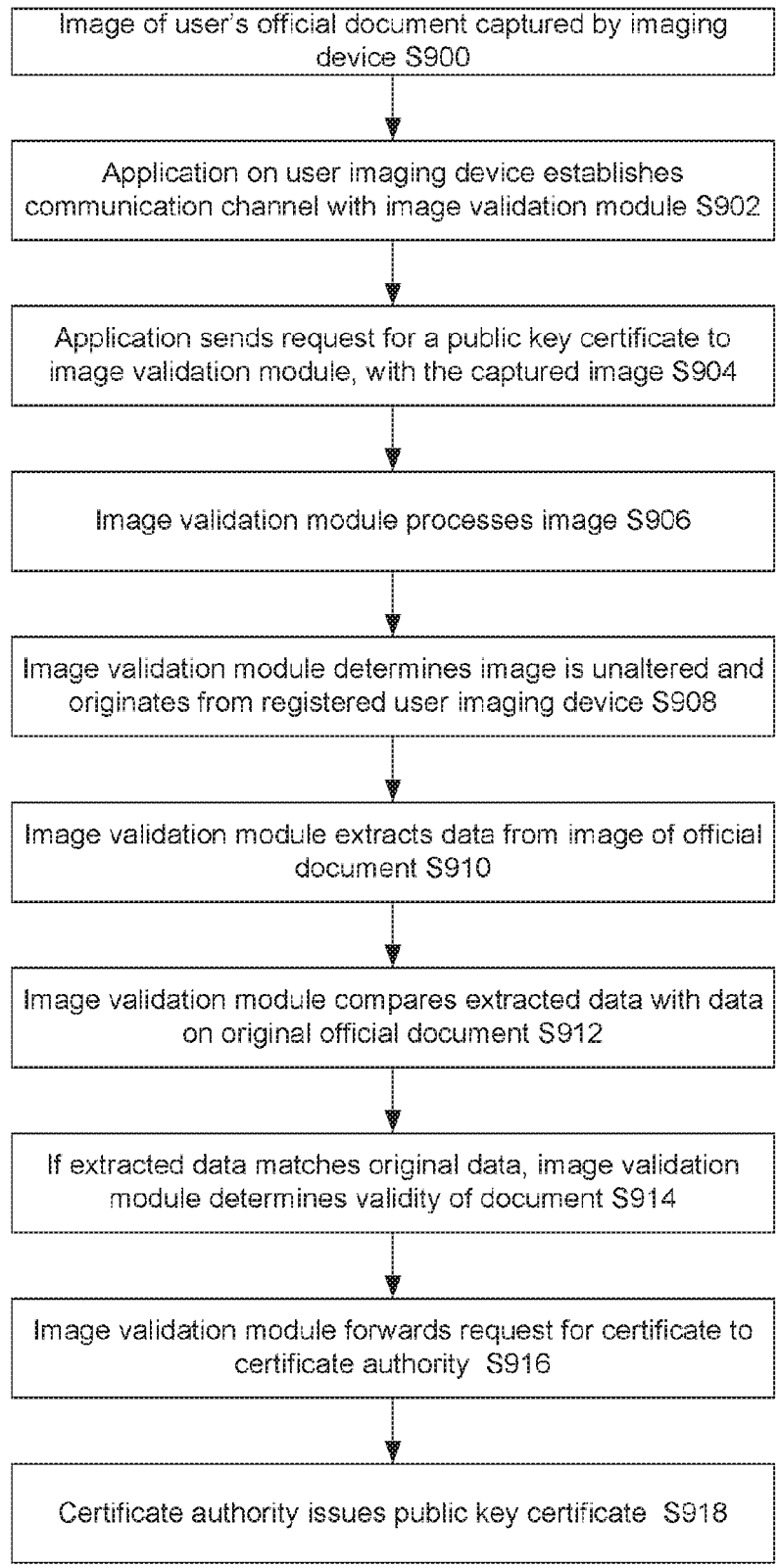
FIG. 9 shows a flow chart of example steps to request a public key certificate for a public key infrastructure using the system of FIG. 1.

Likewise, it is possible to use a registration process to offer a remote yet secure RA service against a central certification authority. Accordingly, FIG. 9 shows a flow chart of example steps to request a public key certificate for a public key infrastructure using the system of FIG. 1. In this process, the user simply captures a picture of his/her official document using his imaging device (S900). An application on the user imaging device establishes a channel with the image validation module of a RA service (S902). The application sends a request for the certificate to the image validation module with the captured image of the ID document (S904). The image is verified using image processing techniques (S906). Image forensics as described earlier are used to determine that the image is genuine (S908), and then the image is processed to extract, using OCR, the user's credentials featured in the image of the official document (S910). The image validation module preferably queries a central validation service to verify the validity of the official document presented by the user, e.g. by comparing the extracted data with that known by the central validation service (S912). If the extracted data matches the original data, the document is determined to be valid (S914). Upon successful verification, a certificate request containing some or all user's credentials contained in the captured image is sent to the certificate authority (S916), to enable the certificate authority to issue the requested certificate (S918). This process ensures that the user is proved to be in possession of a valid official identification document at time of registration. Furthermore, it ensures that the user is authenticated based on what he is (by extracting the information available from his official document) and based on what he knows (i.e. a password either agreed on earlier, or negotiated during registration, which will be used to later on control the usage of the key for which a certificate has been issued).

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A validation and authentication system for authenticating and validating messages, the system comprising:

a memory storing one or more digital fingerprints associated with user imaging devices, wherein the one or more digital fingerprints are each based on a photo response non-uniformity (PRNU) associated with a corresponding one of the user imaging devices;
a communication module configured to:
receive a message M;
receive a request for validation and authentication; and
receive an image $P_M$ of the message M captured using a user imaging device; and
an image validation module for analysing the received image $P_M$ to determine if the image is valid by determining whether the received image $P_M$ comprises a digital fingerprint matching one of the one or more digital fingerprints stored in the memory and to determine if the received image $P_M$ is authentic by extracting data from the received image $P_M$ and comparing the extracted data with the message M,
wherein, if the received image $P_M$ is determined to be authentic and valid, the image validation module generates a response to the request.

2. The validation and authentication system as claimed in claim 1, wherein the request is a request for validation and authentication of the message M and wherein, if the received image $P_M$ is determined to be authentic and valid, the image validation module generates a response to the request which confirms that the message M is authentic and valid.

3. The validation and authentication system as claimed in claim 1, wherein the request is a request for validation and authentication of a user using the user imaging device and wherein, if the received image $P_M$ is determined to be authentic and valid, the image validation module generates a response to the request which confirms that the user is authentic and valid.

4. The validation and authentication system as claimed in claim 1, wherein the image validation module comprises a ballistics sub-module configured to determine that the received image $P_M$ comprises a digital fingerprint matching one of the digital fingerprints stored in the memory.

5. The validation and authentication system as claimed in claim 1, wherein the image validation module comprises a forensics sub-module configured to determine that the received image $P_M$ has not been altered during transit to the validation and authentication system.

6. The validation and authentication system as claimed in claim 1, wherein the image validation module comprises an optical character recognition sub-module configured to extract data from the received image $P_M$ and compare the extracted data with the received message M.

7. The validation and authentication system as claimed in claim 1, wherein the communication module is configured to receive the message M from a third party system.

8. The validation and authentication system as claimed in claim 1, wherein the communication module is configured to receive the request for validation and authentication from a user or a third party system.

9. The validation and authentication system as claimed in claim 1, wherein the communication module is configured to receive image $P_M$ of the message M from a user.

10. The validation and authentication system as claimed in claim 1, which is a central validation and authentication system which is remote from the user imaging device.

11. A validating and authenticating method comprising:
receiving a message M;
receiving a request for validation and authentication;
receiving an image $P_M$ of the message M captured using a user imaging device;

analysing the received image $P_M$ to:
  determine if the image is valid by determining whether the received image $P_M$ comprises a digital fingerprint matching one of one or more digital fingerprints stored in a memory, wherein said one or more digital fingerprints are associated with user imaging devices, and the one or more digital fingerprints are each based on a photo response non-uniformity (PRNU) associated with a corresponding one of the user imaging devices; and
  determine if the image is authentic by extracting data from the received image $P_M$ and comparing the extracted data with the message M; and
  generating, if the image is valid and authentic, a response to the request.

12. The method as claimed in claim 11, wherein receiving the request comprises:
  receiving a request for validation and authentication of the message M and generating the response comprises generating a response which confirms or denies that the message M is authentic and valid; or
  receiving a request for validation and authentication of a user using the user imaging device and generating the response comprises generating a response which confirms or denies that the user is authentic and valid.

13. The method as claimed in claim 11, wherein analysing the received image $P_M$ comprises using a ballistics image processing algorithm to extract the digital fingerprint from the received image $P_M$.

14. The method as claimed in claim 13 wherein analysing the received image $P_M$ further comprises comparing the extracted digital fingerprint with a set of stored digital fingerprints, and determining if the extracted digital fingerprint corresponds to a stored digital fingerprint.

15. The method as claimed in claim 11, wherein analysing the received image $P_M$ further comprises at least one of:
  using a forensics image processing algorithm to determine that the received image $P_M$ has not been altered during transit; and
  using an optical character recognition algorithm to extract data from the received image $P_M$ and compare the extracted data with the received message M.

16. The method as claimed in claim 11, wherein receiving a message M comprises receiving the message M from a third party system.

17. The method as claimed in claim 11, wherein receiving a request for validation and authentication comprises receiving a request from a user imaging device or a third party system.

18. The method as claimed in claim 11, wherein receiving an image $P_M$ of the message M comprises capturing an image $P_M$ of the message M using a user imaging device and receiving the image from the user imaging device.

19. A method of generating a digital signature, the method comprising:
  receiving a request to create a signature for an electronic message $M_F$;
  generating a validation challenge comprising an electronic message M which is based on message $M_F$;
  authenticating and validating using the steps of claim 11; and
  generating the signature for the electronic message $M_F$.

20. A method of generating a digital signature, the method comprising: receiving a request to create a signature for an electronic message $M_F$;
  generating a validation challenge comprising the electronic message M which is based on message $M_F$;
  receiving the electronic message M;
  receiving a request for validation and authentication;
  validating and authenticating by:
    receiving an image $P_M$ of the electronic message M from a user;
    analysing the received image $P_M$ to:
    determine if the image is valid by determining whether the received image $P_M$ comprises a digital fingerprint matching one of one or more digital fingerprints stored in a memory, wherein said one or more digital fingerprints are associated with user imaging devices, and the one or more digital fingerprints are each based on a photo response non-uniformity (PRNU) associated with a corresponding one of the user imaging devices; and
    determine if the image is authentic by extracting data from the received image $P_M$ and comparing the extracted data with the message M;
  generating a validation response confirming that the received image $P_M$ is valid and authentic; and
  generating the signature for the electronic message $M_F$.

21. The method of claim 20, comprising:
  generating the signature for the electronic message $M_F$ using a signature creation device which is local to the user imaging device.

22. The method of claim 21, comprising:
  authenticating and validating at an authentication and validation system which is part of the signature creation device; or
  authenticating and validating at an authentication and validation system which is part of the user imaging device or part of a user transaction device.

23. The method of or claim 20, comprising:
  authenticating and validating at an authentication and validation system which is remote from the user imaging device; and
  generating the signature for the electronic message $M_F$ using a signature creation device which is remote from the user imaging device.

24. A non-transitory data carrier carrying processor control code which when running on a processor, causes the processor to implement a method for validating and authenticating comprising the steps of:
  receiving a message M;
  receiving a request for validation and authentication;
  receiving an image $P_M$ of the message M captured using a user imaging device;
  analysing the received image $P_M$ to:
  determine if the image is valid by determining whether the received image $P_M$ comprises a digital fingerprint matching one of one or more digital fingerprints stored in a memory, wherein said one or more digital fingerprints are associated with user imaging devices, and the one or more digital fingerprints are each based on a photo response non-uniformity (PRNU) associated with a corresponding one of the user imaging devices; and
  determine if the image is authentic by extracting data from the received image $P_M$ and comparing the extracted data with the message M; and
  generating, if the image is valid and authentic, a response to the request.

25. A system for generating a digital signature on behalf of a user, the system comprising:
  a signature server;
  a memory storing one or more digital fingerprints associated with user imaging devices, wherein the one or more digital fingerprints are each based on a photo response non-uniformity (PRNU) associated with a corresponding one of the user imaging devices;

a communication module configured to:
- receive a request to create a signature for an electronic message $M_F$;
- receive an electronic message M, which is based on the electronic message $M_F$;
- receive a request for validation and authentication; and
- receive an image $P_M$ of the electronic message M from a user; and an image validation module for analysing the received image $P_M$ to determine if the image is valid by determining whether the received image $P_M$ comprises a digital fingerprint matching one of the one or more digital fingerprints stored in the memory and to determine if the received image $P_M$ is authentic by extracting data from the received image $P_M$ and comparing the extracted data with the message M, wherein, if the received image $P_M$ is determined to be authentic and valid, the signature server generates a digital signature for the electronic message $M_F$.

* * * * *

UNITED STATES PATENT AND TRADEMARK OFFICE
CERTIFICATE OF CORRECTION

PATENT NO. : 10,581,612 B2  
APPLICATION NO. : 15/555425  
DATED : March 3, 2020  
INVENTOR(S) : Peter Landrock Page 1 of 1

It is certified that error appears in the above-identified patent and that said Letters Patent is hereby corrected as shown below:

In the Specification

In Column 2, Line 28, delete "not be" and insert --not been--.

In Column 5, Line 22, delete "party)" and insert --party).--.

In Column 6, Line 47, delete "e.g." and insert --e.g.,--.

In Column 8, Line 5, delete "stick" and insert --stick.--.

In Column 11, Line 44, delete "Mandian" and insert --Mahdian--.

In Column 11, Line 44, delete "al" and insert --al.--.

In Column 12, Line 27, delete "Mandian" and insert --Mahdian--.

In the Claims

In Column 28, Line 33, Claim 23, delete "of or" and insert --of--.

Signed and Sealed this  
Second Day of June, 2020

Andrei Iancu  
*Director of the United States Patent and Trademark Office*